(12) United States Patent
Marron et al.

(10) Patent No.: US 8,068,235 B1
(45) Date of Patent: Nov. 29, 2011

(54) SYSTEMS AND METHODS FOR MULTI-FUNCTION COHERENT IMAGING

(75) Inventors: Joseph C. Marron, Pittsford, NY (US); Richard L. Kendrick, San Mateo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 268 days.

(21) Appl. No.: 11/878,367

(22) Filed: Jul. 24, 2007

(51) Int. Cl.
*G01B 11/02* (2006.01)
(52) U.S. Cl. ..................................... 356/512; 356/495
(58) Field of Classification Search .................. 356/495, 356/512, 520
See application file for complete search history.

(56) References Cited

U.S. PATENT DOCUMENTS

| | | | | | |
|---|---|---|---|---|---|
| 4,498,773 | A | * | 2/1985 | von Bieren | 356/516 |
| 6,137,574 | A | * | 10/2000 | Hill | 356/486 |
| 7,057,738 | B2 | * | 6/2006 | Millerd et al. | 356/495 |
| 7,283,248 | B2 | * | 10/2007 | Hill | 356/498 |
| 7,405,834 | B1 | | 7/2008 | Marron et al. | |
| 2003/0128368 | A1 | * | 7/2003 | Kuchel | 356/512 |
| 2005/0146727 | A1 | * | 7/2005 | Hill | 356/498 |

OTHER PUBLICATIONS

Marron et al.; Three-Dimensional Imaging Using a Tunable Laser Source; Optical Engineering; Jan. 2000; pp. 47-51; vol. 39, No. 1; ; Society of Photo-Optical Instrumentation Engineers.
Wyant; Testing Aspherics Using Two-Wavelength Holography; Applied Optics; Sep. 1971; pp. 2113-2118; vol. 10, No. 9.
Wyant et al.; Testing Aspherics Using Two-Wavelength Holography: Use of Digital Electronic Techniques; Applied Optics; Nov. 15, 1984; pp. 4020-4023; vol. 23, No. 22.
Marron et al.; Three-dimensional Lensless Imaging Using Laser Frequency Diversity; Applied Optics; Jan. 10, 1992; pp. 255-262; vol. 31, No. 2.
Paxman et al.; Aberration Correction of Speckled Imagery With an Image-Sharpness Criterion; SPIE vol. 976 Statistaical Optics; 1988; pp. 37-47.

\* cited by examiner

*Primary Examiner* — Tarifur Chowdhury
*Assistant Examiner* — Jonathon D Cook
(74) *Attorney, Agent, or Firm* — McDermott Will & Emery LLP

(57) ABSTRACT

Systems and methods are provided for multi-function coherent imaging comprising directing a first coherent radiation beam and a second coherent radiation beam towards a detector, where the second coherent radiation beam is spatially offset, angularly offset, or spatially and angularly offset from the first coherent radiation beam. A portion of the first coherent radiation beam and a portion of the second coherent radiation beam may be combined to form a composite beam. An object may be radiated with the composite beam. A first intensity pattern may be formed by interfering with return radiation from the radiated object with the first coherent radiation beam and a second intensity pattern is formed with the return radiation from the radiated object and the second coherent radiation beam. A detector may simultaneously record a superposition of the first intensity pattern and the second intensity pattern.

16 Claims, 16 Drawing Sheets

SYSTEMS AND METHODS FOR MULTI-FUNCTION COHERENT IMAGING

STATEMENT AS TO RIGHTS TO INVENTIONS MADE UNDER FEDERALLY SPONSORED RESEARCH OR DEVELOPMENT

Not Applicable.

FIELD OF THE INVENTION

The present invention generally relates to imaging and, in particular, relates to multi-function coherent imaging.

BACKGROUND OF THE INVENTION

In the field of laser remote sensing and imaging, an object is typically radiated with a laser source, and the reflected light intensity is measured to determine the characteristics of the object. Typically, the object is spatially scanned with a narrow laser beam, and the intensity of the reflected beam is measured as a function of beam location. Alternatively, the object can be flood illuminated with laser light and the image can be recorded by using a detector array with a conventional lens in a manner analogous to flash photography.

One method for performing image detection requires serially illuminating an object with the desired laser frequencies or other discriminants and recording the data with a detector as a sequence of frames. One difficulty in performing serial detection in realistic conditions is that slight object motion, on the order of the wavelength of light, can introduce phase decorrelation in the data that complicates subsequent processing or makes such processing impossible. Systems designers are forced to consider custom detectors with high-frame rates or high pixel rates; however, technological limitations make this difficult. Such custom detectors and the imaging systems that use them are complex, costly to manufacture, and often have very limited applications for which they are useful.

SUMMARY OF THE INVENTION

According to one aspect, the present invention provides systems and methods for multi-function coherent imaging by simultaneously recording complex-valued data corresponding to multiple functions.

In accordance with one aspect, exemplary digital holographic systems and methods of the present invention may be used for performing coherent detection and imaging. Such systems and methods may utilize multiple frames of coherent data for image formation, including the formation of three-dimensional images. Such systems and methods may also record multiple coherent images simultaneously. They may also utilize high-density, low-speed detector arrays to spatially encode information, rather than using expensive high-speed detector arrays.

In accordance with one aspect of the present invention, multiple coherent images may be simultaneously recorded by using different spatial carrier frequencies for two or more radiation beams. In one aspect of the present invention, multi-wavelength data, multi-spectral data, multi-polarization data, or any combination thereof may be recorded. In addition, moving objects may be imaged.

An exemplary embodiment relates to a multi-function coherent imaging system, comprising a first coherent radiation source configured to output a first radiation beam, and a second coherent radiation source configured to output a second radiation beam. The exemplary system further comprises one or more first optical components configured to direct at least a portion of the first radiation beam and at least a portion of the second radiation beam towards a first detector, wherein at least a portion of second radiation beam is spatially offset, angularly offset, or spatially and angularly offset from at least a portion of the first radiation beam.

The exemplary system further comprises one or more second optical components configured to combine at least a portion of the first radiation beam and at least a portion of the second radiation beam to form a first composite beam, wherein the one or more second optical components are further configured to direct the first composite beam towards an object to be imaged. The exemplary system further comprises the first detector configured to simultaneously record a first superposition of a first intensity pattern of a first interference between at least a portion of the first radiation beam and at least a portion of first return radiation from the object, and a second intensity pattern of a second interference between at least a portion of second radiation beam and at least a portion of the first return radiation from the object.

Another exemplary embodiment relates to a multi-function coherent imaging system, comprising a first coherent radiation source having a first master oscillator configured to output a first radiation beam. The first coherent radiation source also has a first slave device configured to pulse the first radiation beam so as to output a first pulsed radiation beam coherent with the first radiation beam towards an object to be imaged. The first coherent radiation source also has a first optical switch configured to gate at least a portion of the first radiation beam such that at least a portion of the first radiation beam radiates a detector during a temporal period when at least a portion of return radiation is returning from the object.

The exemplary system further comprises a second coherent radiation source having a second master oscillator configured to output a second radiation beam. The second coherent radiation source also has a second slave device configured to pulse the second radiation beam so as to output a second pulsed radiation beam coherent with the second radiation beam towards an object to be imaged. The second coherent radiation source also has a second optical switch configured to gate at least a portion of the second radiation beam such that at least a portion of the second radiation beam radiates the detector during a temporal period when at least a portion of the return radiation is returning from the object. The exemplary system further comprises the detector configured to simultaneously record a superposition of a first intensity pattern of a first interference between the first radiation beam and return radiation from the object, and a second intensity pattern of a second interference between the second radiation beam and at least a portion of the return radiation from the object.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
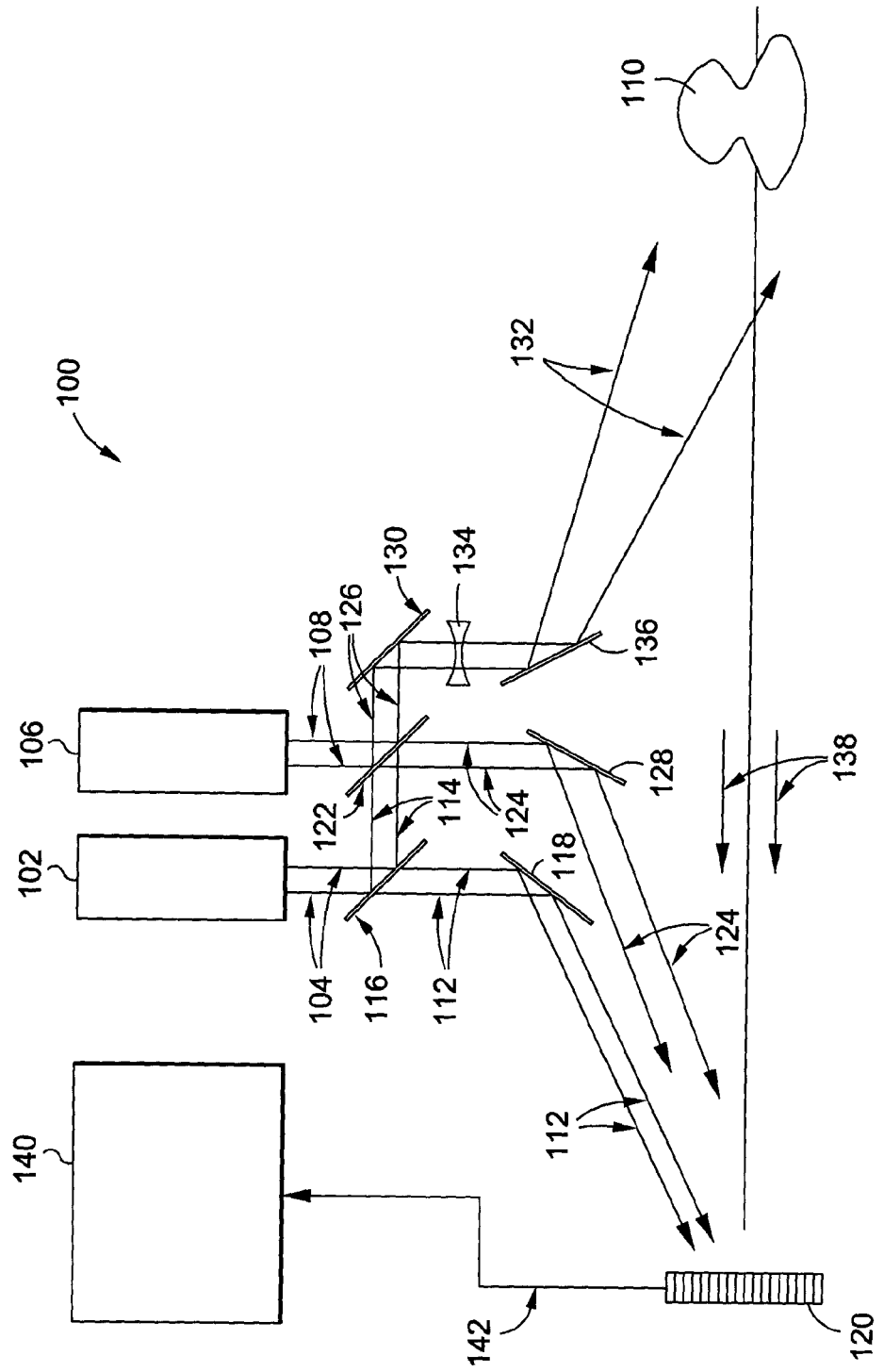
FIG. 1 illustrates a multi-function coherent imaging system in accordance with one embodiment of the present invention.

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

According to one aspect of the present invention, a plurality of sources of coherent radiation may output one or more radiation beams, which may be divided into reference radiation beams and object illumination beams. The radiation beams from the coherent radiation sources may be pulsed beams or continuous wave beams. The plurality of coherent radiation sources are preferably tunable lasers capable of producing radiation with wavelengths greater than or equal to about 800 nm and with optical power of about one watt or greater. The object illumination beams may radiate a distant object for digital holographic detection. Radiation reflected by the object may be incident upon a detector array where it interferes with radiation from a mutually coherent radiation beam. The detector array may simultaneously record the intensity of one or more interference patterns formed between a least a portion of the one or more radiation beams and at least a portion of the return radiation from the object. The recoded intensity patterns may be digitized and sent to a digital processor. Thus, complex-valued data corresponding to multiple functions may be recorded simultaneously.

The digital processor may be configured to compute the two-dimensional digital Fourier transform of the recorded intensity patterns. A two dimensional array of complex-valued numbers may be formed by the digital processor. The formed array may contain a complex-valued image of the object that is spatially separated from other unwanted image terms, including a twin image. The complex-valued image of the object may be extracted from the digital data set. Subsequent processing, such as digital focusing or interferometric analysis, may be performed on the extracted object.

One aspect of the present invention relates to multi-aperture coherent imaging systems. Coherent data from individual sub-aperture multi-function coherent imaging systems may be combined digitally using a computer, processor, integrated circuit, or any other suitable device to achieve fine-spatial resolution imaging corresponding to a large synthetic aperture.

In accordance with one aspect of the present invention, photon-limited detection of signals that are dominated by detector or background noise may be performed. This may be accomplished by having one or more strong local oscillators, such as one or more coherent radiation sources. For digital holographic applications, instead of increasing the magnitude of one or more local oscillators, the magnitude of the reference radiation beam may be increased. Thus, the signal-to-noise ratio of recorded images may be improved.

Multi-Function Coherent Detection

FIG. 1 illustrates multi-function coherent imaging system 100 in accordance with one aspect of the present invention. First coherent radiation source 102 may be configured to output first radiation beam 104, and second coherent radiation source 106 may be configured to output second radiation beam 108. First coherent radiation source 102 and second coherent radiation source 106 may be, for example, gas lasers, solid state lasers, semiconductor lasers, fiber lasers, or any other suitable coherent radiation sources. First and second radiation beams 104 and 108 may have different wavelengths, different polarizations, or different polarizations and wavelengths from one another. In addition, first coherent radiation source 102 and second coherent radiation source 106 may be configured such that radiation beams 104 and 108 are pulsed to reduce the sensitivity of imaging system 100 to motion of object 110. Pulsed radiation imaging system may be further described below in connection with FIGS. 21-22.

Second coherent radiation source 106 may be spatially offset from first coherent radiation source 102, and second coherent radiation source 106 may be configured such that second radiation beam 108 may be spatially offset, angularly offset, or spatially and angularly offset from first radiation beam 104. First radiation beam 104 may be divided into radiation beam 112 and radiation beam 114 by optical component 116, which may be, for example, a polarizing mirror, a beamsplitter, or any other suitable optical component. Radiation beam 112 may be directed to optical component 118 (e.g., a mirror), which may direct beam 112 towards detector 120. Detector 120 may be any suitable imaging detector, imaging detector array, or imaging sensor. Radiation beam 114 may be directed by optical component 116 towards optical component 122.

Similarly, second radiation beam 108 may be divided by optical component 122, which may be a polarizing mirror, a beamsplitter, or any other suitable optical component. Second radiation beam 108 may be divided into radiation beam 124 and radiation beam 126. Radiation beam 124 may be directed to optical component 128 (e.g., a mirror), where radiation beam 124 may be reflected by optical component 128 towards detector 120. Radiation beam 126 may be reflected by optical component 122, and radiation beam 114 may be transmitted though optical component 122 as to co-propagate with radiation beam 126 along the same optical axis. Thus, co-propagating beams 114 and 126 (for simplicity, referred to as composite beam 126) may be reflected by optical component 130 (e.g., a mirror), directed through one or more optical components 134 (e.g., lenses) and reflected by optical component 136 (e.g., a mirror) to produce composite beam 132 which radiates object 110.

Thus, first radiation beam 104 and second radiation beam 108 may be divided to form individual radiation beams 112 and 124, as well as composite beam 132. Radiation beams 112 and 124 may have different wavelengths, different polarizations, or different polarizations and wavelengths from one another. Radiation beam 124 may be spatially offset, angularly offset, or spatially and angularly offset from radiation beam 112. Composite beam 132 radiates object 110, and radiation scattered from object 110 (i.e., return radiation 138) propagates to detector 120. Detector 120 also may be radiated by radiation beams 112 and 124 that propagate to detector 120, where radiation beams 112 and 124 may have spatial separation, angular separation, or spatial and angular separation. According to one aspect, components shown in FIG. 1 such as components 116, 118, 122, 128, 130, 134, and 136 are optical components. Radiation beams 112 and 124 may be referred to as reference radiation beams, and composite beam 132 may be referred to as an object illumination beam.

Because radiation beams 112 and 124 are mutually incoherent, detector 120 may record the superposition of two intensity patterns. For example, a first intensity pattern may be formed from the interference between at least a component of return radiation 138 and radiation beam 112. A second intensity pattern may be formed from the interference between at least a component of return radiation 138 and radiation beam 124. Detector 120 may record the superposition of the first intensity pattern to the second intensity pattern. The recorded superposition of the intensity patterns by detector 120 may be digitized into an output signal, which is transmitted to processor 140 via communicative coupling 142 or any other suitable communication medium.

Figure 4:
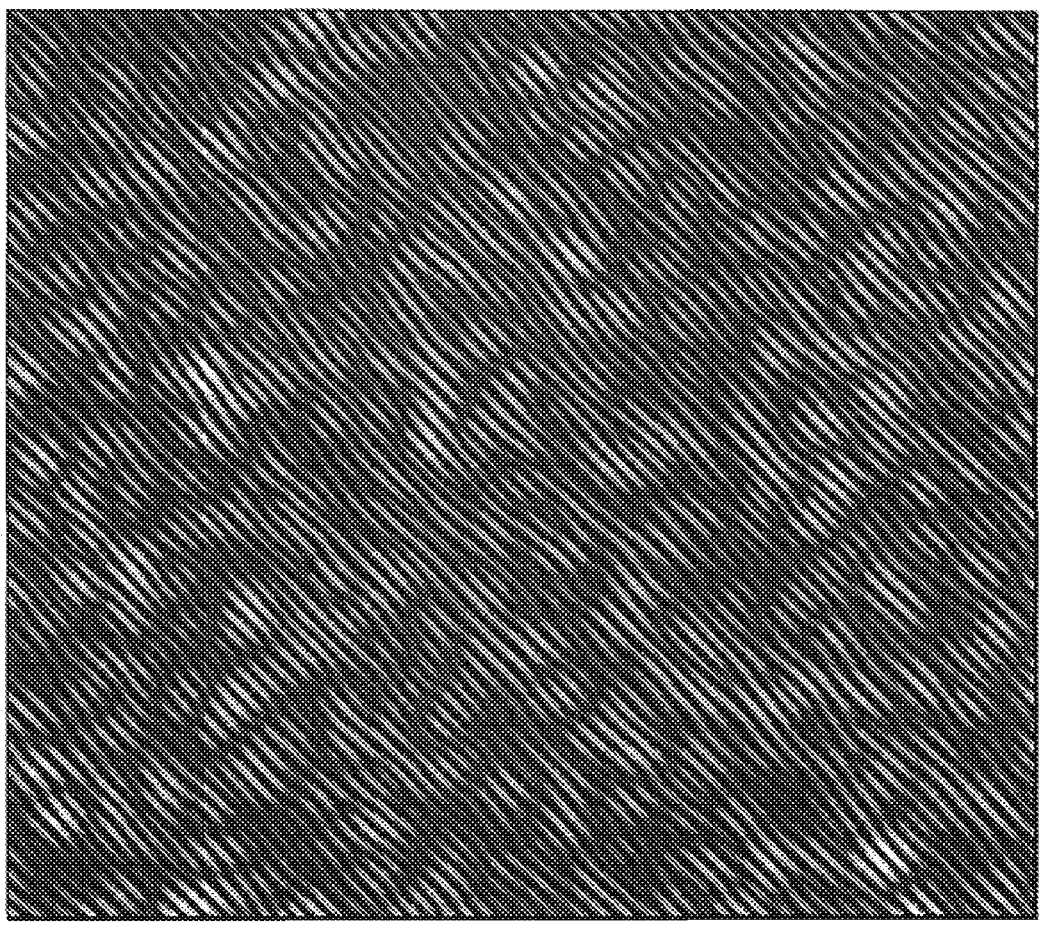
FIG. 4 illustrates an exemplary recorded intensity pattern by a multi-function coherent imaging system in accordance with one aspect of the present invention.
Figure 5:
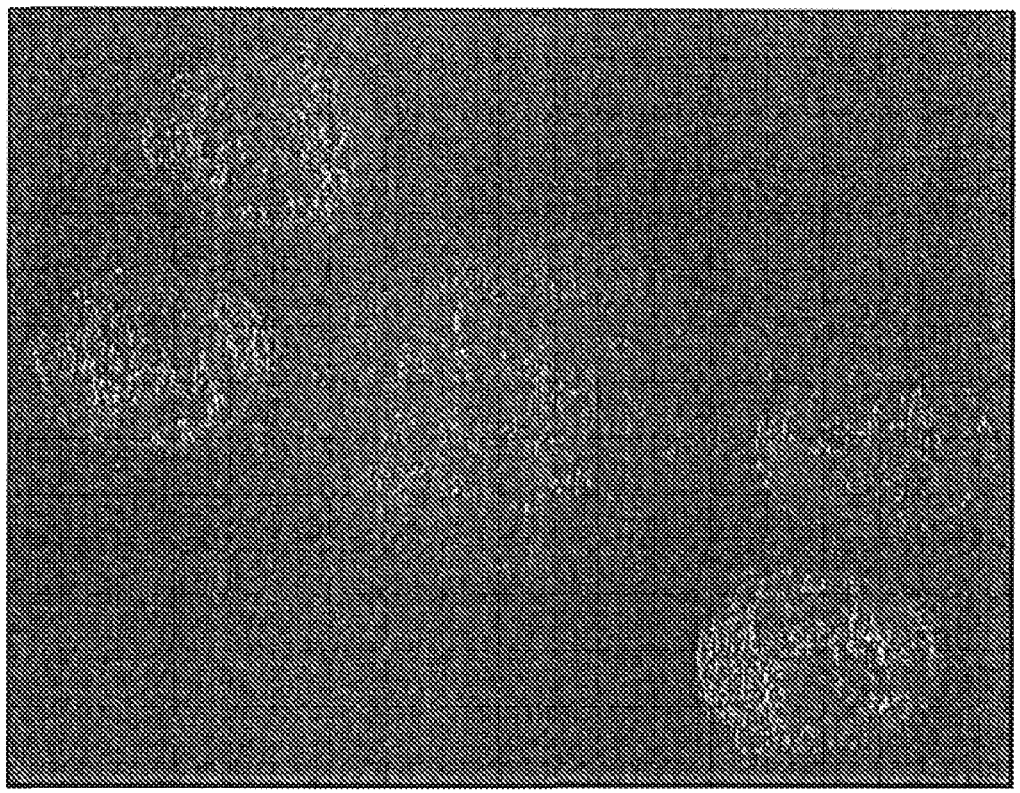
FIG. 5 illustrates an exemplary magnitude image of a Fourier transform of an intensity pattern recorded by a multi-function coherent imaging system in accordance with one aspect of the present invention.

FIG. 4 illustrates an exemplary superposition intensity pattern (i.e., speckle pattern) recorded by detector 120 of FIG. 1 in accordance with one aspect of the present invention. Processor 140 may perform a two-dimensional Fourier transform of the output signal by detector 120. An illustration of the output of this process is shown in FIG. 5.

Turning to FIG. 1, given the spatial offsets, angular offsets, or spatial and angular offsets of radiation beam 112 and radiation beam 124 of FIG. 1, the images formed using these beams may be spatially separated and extracted for subsequent processing by processor 140. Thus, with detector 120, system 100 may simultaneously record multiple frames of coherent data corresponding to multiple functions.

For example, subsequent processing by processor 140 of the extracted images may form three-dimensional images. Consider that first coherent radiation source 102 and second coherent radiation source 106 in FIG. 1 operate at frequencies $v_1$ and $v_2$ with the complex-valued data recorded at, for example, two different wavelengths (e.g., first coherent radiation source 102 outputs radiation beam 112 having a first wavelength, and second coherent radiation source 106 outputs radiation beam 124 having a second wavelength). Three-dimensional images may be formed by determining the phase difference of the two images on a pixel-by-pixel basis. The relationship between distance and phase difference may be represented as $$D = \frac{c\Delta\phi}{4\pi(v_1 - v_2)}, \quad (1)$$

where c is the speed of light, $\Delta\phi$ is the measured phase difference, and $v_1$ and $v_2$ are the two transmitted frequencies. Note that distance determination with this method is subject to ambiguity interval limitation with the ambiguity interval given by $c/2(v_1-v_2)$.

Figure 6:
FIG. 6 illustrates an exemplary intensity image produced from multiple speckle realizations using a multi-function coherent imaging system in accordance with one aspect of the present invention.
Figure 7:
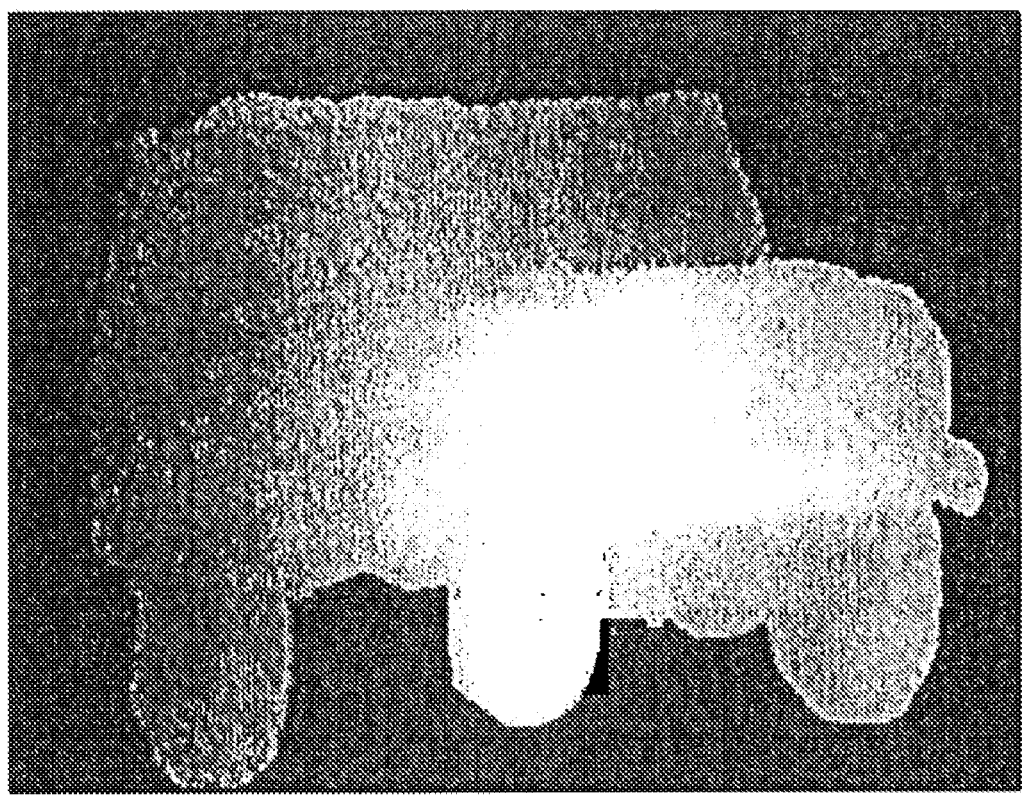
FIG. 7 illustrates an exemplary gray-scale encoded three-dimensional image produced from two-wavelength complex-valued data using a multi-function coherent imaging system in accordance with one aspect of the present invention.

Image results of data collected using this two-wavelength method are shown in FIGS. 6 and 7. FIG. 6 contains the reflectivity image of a scale model truck, and FIG. 7 shows the corresponding gray-scale encoded three-dimensional image. These images resulted from averaging eight pairs of two-wavelength data corresponding to different speckle realizations.

Figure 2:
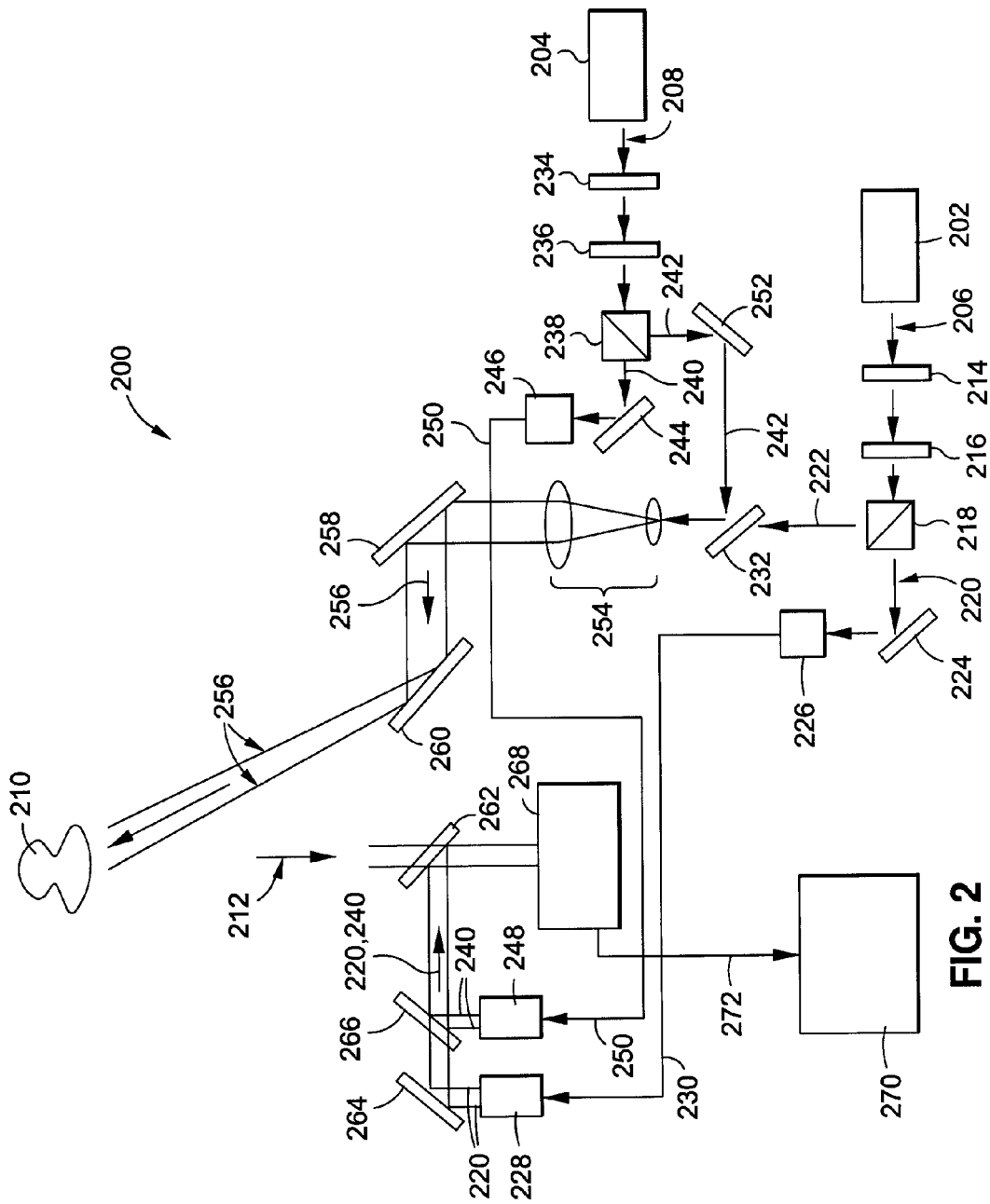
FIG. 2 illustrates another multi-function coherent imaging system in accordance with one embodiment of the present invention.

Another exemplary embodiment of the present invention is illustrated in FIG. 2, where system 200 for multi-function coherent imaging of distant objects is shown. Similar to system 100 illustrated in FIG. 1, system 200 may have first coherent radiation source 202 and second coherent radiation source 204. First coherent radiation source 202 and second coherent radiation source 204 may be, for example, gas lasers, solid state lasers, semiconductor lasers, fiber lasers, or any other suitable coherent radiation sources. First coherent radiation source 202 may be configured to output first radiation beam 206, which may have a wavelength, spectrum, or wavelength and spectrum which may be different from second radiation beam 208 output by second coherent radiation source 204. In addition, first coherent radiation source 202 and second coherent radiation source 204 may be configured such that first radiation beam 206 and second radiation beam 208 are pulsed to decrease the sensitivity of imaging system 200 to motion of object 210. The output beams (e.g., first radiation beam 206 and second radiation beam 208) of first coherent radiation source 202 and second coherent radiation source 204 may be utilized as local oscillators in order to form interference patterns between return radiation 212 from radiated object 210 and radiation beams 220 and 240, as discussed herein.

First radiation beam 206 may be directed to attenuator 214, which may reduce the optical magnitude (i.e., power) of first radiation beam 206. Although attenuator 214 is illustrated in FIG. 2, it may be removed if first radiation beam 206 has suitable optical power or energy for imaging object 210 and does not saturate detector 268 as described in detail below. First radiation beam 206 may be directed to half-wave plate 216, which alters the polarization state of beam 206. For example, half-wave plate 216 may retard the polarization of first radiation beam 206 by about 180 degrees, such that the polarization direction of first radiation beam 206 is rotated.

First radiation beam 206 may then be directed to polarizing beamsplitter 218, which may be, for example, a polarizing beamsplitter cube or any other suitable optical component. First radiation beam 206 may be divided into beam 220 having a first polarization state and beam 222 having a second polarization state. Polarizing beamsplitter 218 may direct beam 220 to mirror 224, which reflects beam 220 into an optical fiber coupler 226. Fiber coupler 226 may be coupled to fiber collimator 228 with, for example, optical fiber 230. Optical fiber 230 may be configured so as to rotate the polarization state of beam 220 being transmitted through fiber coupler 226 and optical fiber 230 to fiber collimator 228. Beam 222 may be directed from polarizing beamsplitter 218 to beamsplitter 232, where beam 222 may then co-propagate with beam 242 through beam expander optics 254.

Second coherent radiation source 204 may be configured to output second radiation beam 208, which may have a wavelength, spectrum, or wavelength and spectrum which may be different from beam 206 output by first coherent radiation source 202. Second coherent radiation source 204 may be spatially offset from first coherent radiation source 202, and may be configured such that second radiation beam 208 may be spatially offset, angularly offset, or spatially and angularly offset from first radiation beam 206. Second radiation beam 208 may be directed to attenuator 234, which may reduce the optical magnitude (i.e., power) of second radiation beam 208. Although attenuator 234 is illustrated in FIG. 2, it may be removed if second radiation beam 208 has suitable optical power or energy for imaging object 210 and does not saturate detector 268 as described below. Second radiation beam 208 may be directed to half-wave plate 236, which may alter the polarization state of beam 208. For example, half-wave plate 236 may retard the polarization of second radiation beam 208 by about 180 degrees, such that the polarization direction of second radiation beam 208 is rotated.

Second radiation beam 208 may be directed to polarizing beamsplitter 238, which may be, for example, a polarizing beamsplitter cube or any other suitable optical component. Second radiation beam 208 may be divided into radiation beam 240 having a first polarization state and radiation beam 242 having a second polarization state. Polarizing beamsplitter 238 may direct radiation beam 240 to mirror 244, which may reflect radiation beam 240 into optical fiber coupler 246. Fiber coupler 246 may be coupled to fiber collimator 248 with, for example, optical fiber 250. Optical fiber 250 may be configured so as to rotate the polarization state of beam 240 being transmitted through fiber coupler 246 and optical fiber 250 to fiber collimator 248. Beam 242 may be directed from polarizing beamsplitter 238 to mirror 252. Mirror 252 directs beam 242 to beamsplitter 232, where beam 242 may then co-propagate with beam 222 through beam expander optics 254. Beam expander optics 254 may form composite beam 256, which may be comprised of beams 222 and 242 which co-propagate. Composite beam 256 may be directed to mirrors 258 and 260, and then radiate object 210.

Return radiation 212 from object 210 radiated by composite beam 256 may be directed to beamsplitter 262. Beam 220, from fiber collimator 228 may be directed to mirror 264, which reflects beam 220 towards beamsplitter 266. Beam 240, from fiber collimator 248 may be directed to beamsplitter 266. Beams 220 and 240, may co-propagate to beamsplitter 262. At beamsplitter 262, beam 220 may interfere with return radiation 212 to form a first intensity pattern, and beam 240 may interfere with return radiation 212 to form a second intensity pattern. To form the intensity patterns, beam 240 may be spatially offset, angularly offset, or spatially and angularly offset from beam 220. In addition, beam 220 and 240 may have different wavelengths, different polarizations, or different wavelengths and polarizations from one another. Detector 268 records the superposition of the first intensity pattern to the second intensity pattern. According to one aspect, components shown in FIG. 2 such as components 214, 216, 218, 224, 226, 228, 232, 234, 236, 238, 244, 246, 248, 252, 254, 258, 260, 262, 264, and 266 are optical components. Radiation beams 220 and 240 may be referred to as reference radiation beams, and composite beam 256 may be referred to an object illumination beam.

The recorded superposition of the intensity patterns by detector 268 is digitized into an output signal, which is transmitted to digital processor 270 via communicative coupling 272 or any other suitable communication medium. Digital processor 270 may perform a two-dimensional Fourier transform of the data recorded by detector 268. Processor 270 may be configured to operate in a similar manner to processor 140 of FIG. 1, described above. Given the angular offsets of the radiation beams (e.g., beams 220 and 240), the component coherent images may be spatially separated and extracted for subsequent processing by processor 270. Thus, with detector 268 and processor 270, system 200 may simultaneously record multiple frames of coherent data corresponding to multiple functions and process the recorded data to form images.

Digital Holography

Figure 3:
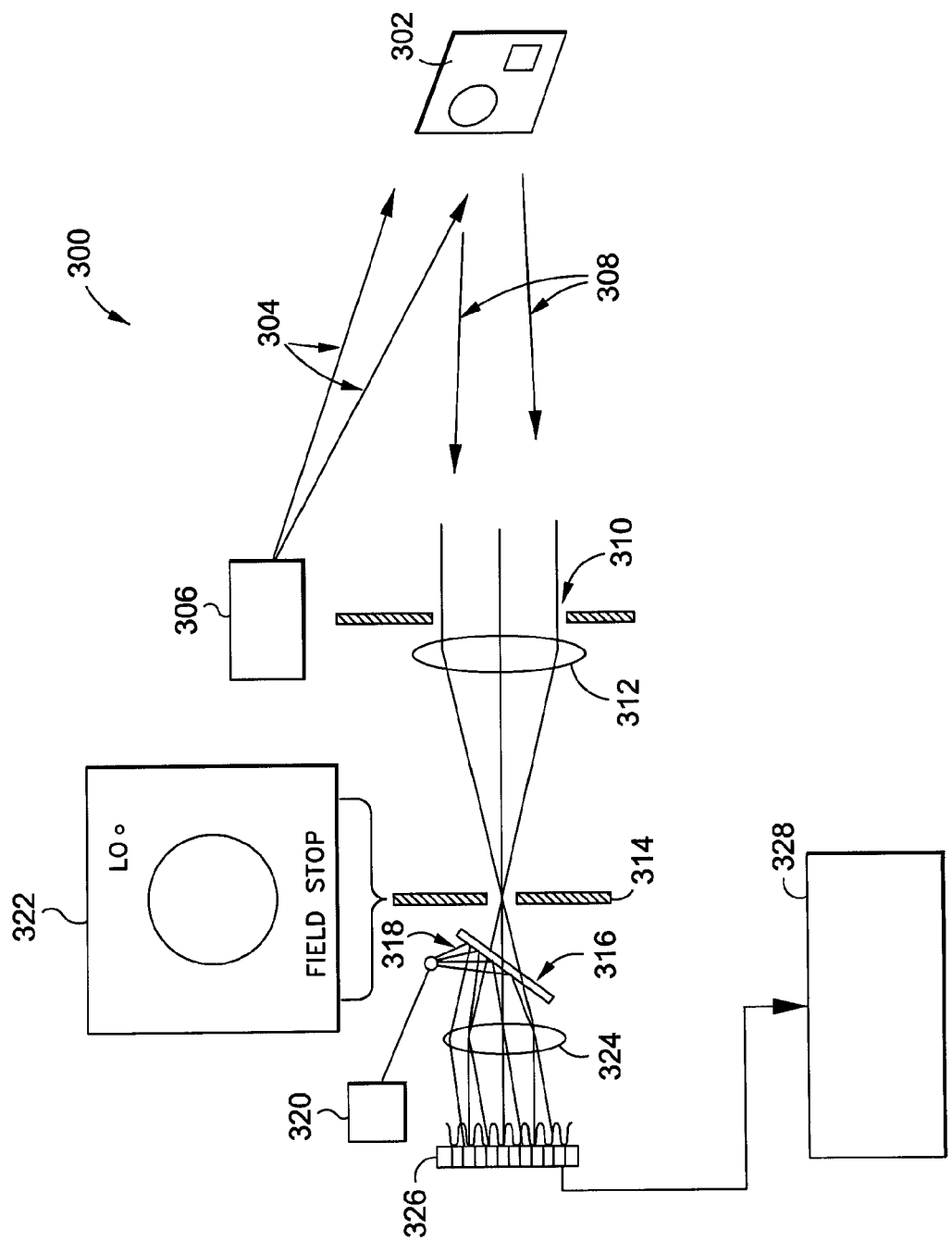
FIG. 3 illustrates a simplified schematic of a digital holography system with an entrance pupil and a field-stop in accordance with one embodiment of the present invention.

System 300 of FIG. 3 illustrates a digital holographic imaging system in accordance with one embodiment of the present invention. Object 302 may be radiated, for example, by composite beam 304 from one or more coherent radiation sources 306. Coherent radiation sources 306 may be one or more gas lasers, solid-state lasers, semiconductor lasers, fiber lasers, or other lasers that output coherent radiation. Coherent radiation sources 306 may output coherent radiation with one or more wavelengths, one or more polarization states, or one or more wavelengths and polarization states. Coherent radiation sources 306 may output coherent radiation that is pulsed, for example, in a similar manner to the pulsed system described in connection with FIGS. 21-22 below. Return radiation 308 from the radiated object 302 may be imaged through entrance pupil 310. The size of entrance pupil 310 may be selected depending on the imaging application so as to increase or decrease the amount of return radiation 308 to be imaged. Return radiation 308 that may pass through entrance pupil 310 may be imaged by one or more lenses 312 onto field-stop 314. Thus, an image of object 302 appears in the plane of field-stop 314.

Field-stop 314 may be configured for reducing or substantially eliminating unwanted background radiation from regions of object 302 that are not radiated by composite beam 304 from coherent radiation sources 306. Beamsplitter 316 may be used to insert one or more radiation beams 318 from one or more coherent radiation sources 320 into a plane conjugate to field-stop 314. One or more radiation beams 318 may be spatially offset, angularly offset, or spatially and angularly offset from one another. One or more radiation beam 318 may also have one or more wavelengths, one or more polarization states, or one or more wavelengths and polarization states. Also shown in FIG. 3 is field-stop image 322, which illustrates an image of distant object 302 in return radiation 308, and a position of one of the one or more radiation beams 318 (identified as "LO") from one or more coherent radiation sources 320 relative to the image formed in field-stop 314.

One or more radiation sources 320 may serve as reference point sources for holographic recording or multi-function coherent imaging. Return radiation 308 and one or more radiation beams 318 may propagate through Fourier transform lens 324. The intensity of the interference pattern is recorded by detector 326. The recorded intensity may be, for example, an intensity pattern of the interference between return radiation 308 and one or more radiation beams 318. For example, a first intensity pattern may be formed from the interference between at least a component of return radiation 308 and a first component of radiation beams 318. A second intensity pattern may be formed from the interference between at least a component of return radiation 308 and a second component of radiation beams 318. Detector 326 records the superposition of the first intensity pattern to the second intensity pattern, and outputs a signal to processor 328 to form and process one or more images in a similar manner as to systems 100 and 200, described above. According to one aspect, components shown in FIG. 3 such as components 310, 312, 314, 316, and 324 are optical components. Beams 318 may be referred to as reference radiation beams, and composite beam 304 may be referred to as an object illumination beam.

Systems 100, 200, and 300, illustrated in FIGS. 1-3 may be expanded, such that such systems comprise more than two coherent radiation sources, each outputting a radiation beam. For example, each radiation beam may have a distinct wavelength, range of wavelengths, output spectrum, polarization, or any combination thereof. Each of the two or more coherent radiation sources may be, for example, spatially offset from one another, and may be configured such that each radiation beam output by the two or more coherent radiation sources is spatially offset, angularly offset, or spatially and angularly offset from each other. In addition, the two or more coherent radiation sources may be configured such that each of their output beams are pulsed to reduce imaging system sensitivity to motion of an object to be imaged. For example, the pulsed coherent radiation sources may have a master oscillator and power amplifier configuration as described below in connection with FIGS. 21-22.

Figure 8:
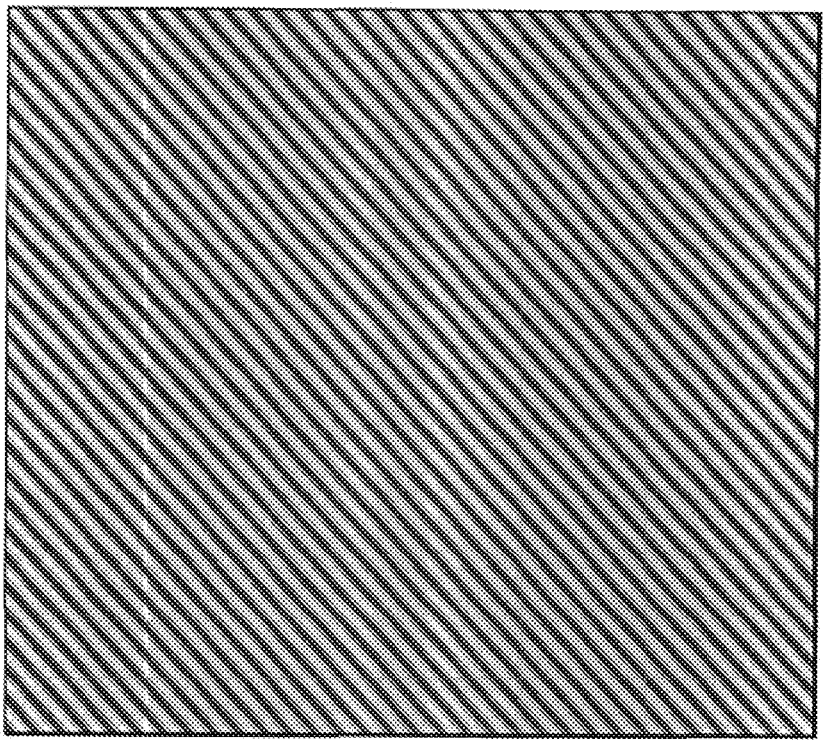
FIG. 8 illustrates an exemplary sinusoidal intensity pattern from a point object imaged by a multi-function coherent imaging system in accordance with one aspect of the present invention.

The intensity pattern recorded by detector 326 may have a sinusoid corresponding to the interference of return radiation 308 from radiated object 302 with the one or more beams from the local oscillators (e.g., one or more radiation beams 318 from one or more coherent radiation sources 320). The spatial frequency of this sinusoid can be analyzed using conventional Fourier optics treatments (e.g., using Fourier lens 324 shown in FIG. 3) of two-beam interference. Alternatively, the Fourier analysis may be performed digitally, for example, by one or more processors (e.g., processor 328 shown in FIG. 3). Decreasing the separation between return radiation 308 from the radiated object 302 and the one or more beams from the local oscillators (e.g., one or more radiation beams 318 from one or more coherent radiation sources 320) may produce fringes with decreased spatial-frequencies. Conversely, increasing separations may increase spatial frequencies. An example of the sinusoidal intensity pattern from return radiation from radiated object 302 interfering with the local oscillator is shown in FIG. 8.

Figure 9:
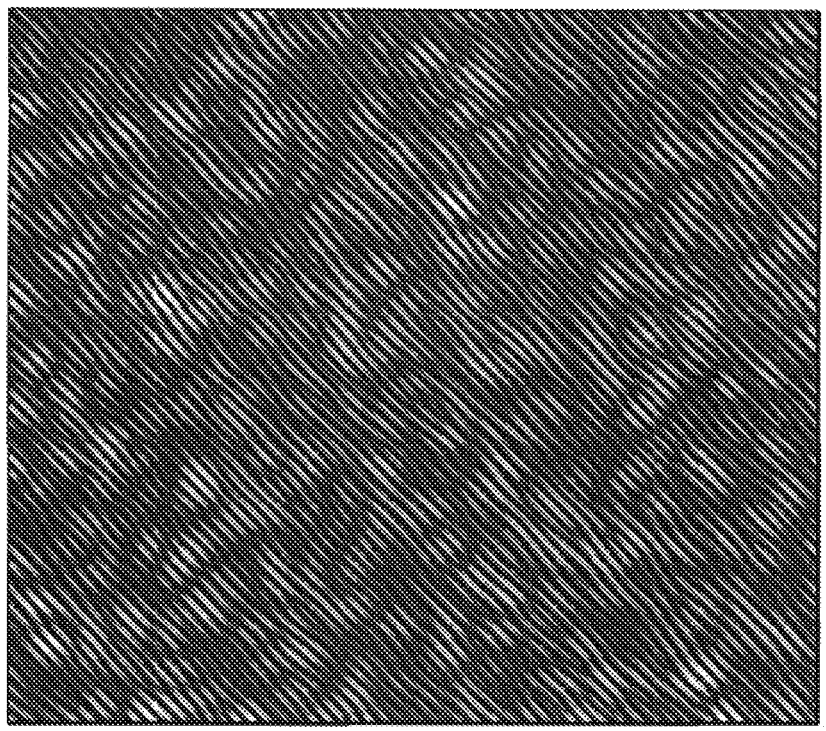
FIG. 9 illustrates an exemplary modulated speckle intensity pattern from a disk object obtained by a multi-function coherent imaging system in accordance with one aspect of the present invention.

The recorded intensity for an object is a pattern that is often referred to as a speckle pattern because of its random, granular appearance. The object field (e.g., field-stop image 322 in field-stop 314 illustrated in FIG. 3) may be regarded a collection of points with deterministic locations and random amplitudes and phases. When the random object field components are mixed with a reference point having a sufficient spatial offset, the resulting intensity pattern has a speckled appearance with a modulation (i.e., carrier frequency) evident within each speckle. An exemplary speckle pattern from a two dimensional, circular disk object is shown in FIG. 9.

Figure 10:
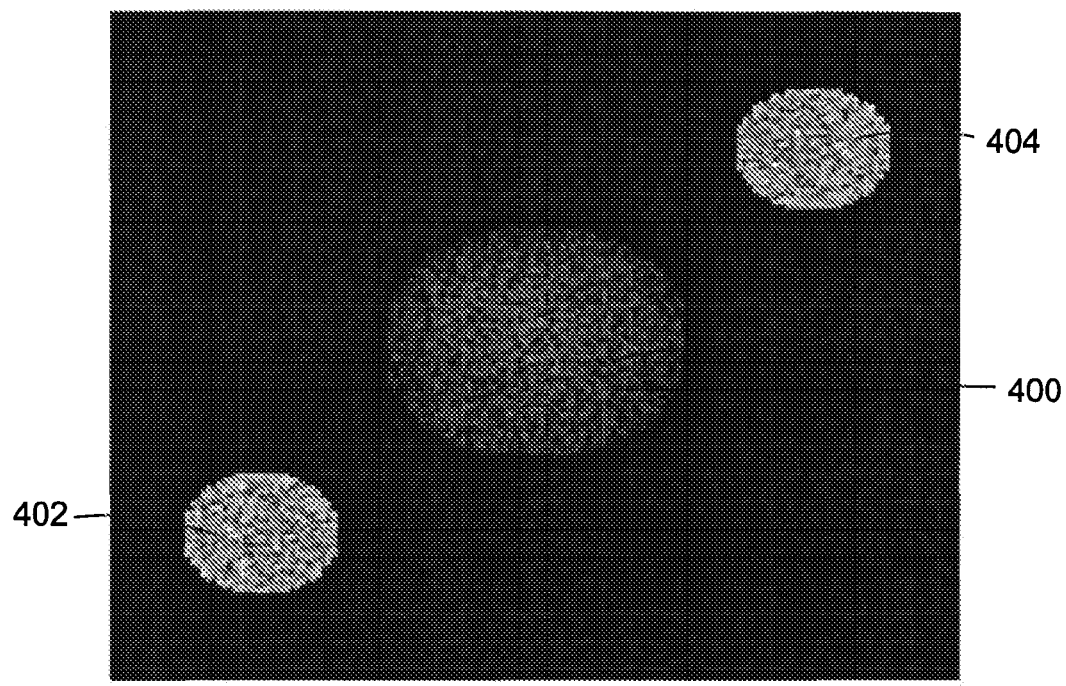
FIG. 10 illustrates a Fourier transform of the speckle intensity pattern of FIG. 9 in accordance with one aspect of the present invention.

Following the recording of an intensity pattern by a detector (e.g., detector 326 shown in FIG. 3), a Fourier transform of the speckle intensity may be computed digitally, for example, by a processor (e.g., processor 328). The Fourier transform of the speckle intensity of FIG. 9 is shown in FIG. 10. Note that two twin disk images (image term 402 and image term 404) are shown in FIG. 10, along with a larger disk (autocorrelation term 400) in the center. In one aspect, the portions of the Fourier transform of the speckle intensity image (e.g., the speckle intensity image illustrated in FIG. 9) may be digitally zeroed so as to distinguish particular image terms. In the equations detailed below, the object may be denoted as f and the reference point as g with their corresponding Fourier transforms given by F and G, respectively. The intensity pattern recorded by the detector (e.g., detector 140 of FIG. 1) may be written as $$I = |(F + G)|^2 \qquad (2)$$
$$= |F|^2 + |G|^2 + FG^* + F^*G.$$

It follows that the Fourier transform of this intensity may be given by $$FT(I) = f \otimes f^* + g \otimes g^* + f \otimes g^* + f^* \otimes g, \qquad (3)$$

where $\otimes$ denotes the convolution operation. If the reference point is a delta function centered at x=b, it may follow that the Fourier transform of the intensity pattern may be given by $$FT(I) = f \otimes f^* + \delta(x) + f(x-b) + f^*(x+b). \qquad (4)$$

Note the correspondence between the terms of Eq. (4) and FIG. 10. The first term in Eq. (4) may relate to the autocorrelation of the object, and the second term may relate to a delta function at the origin (i.e., center of the image) that is zeroed, as discussed above. The final two terms may be a set of twin images spatially offset from the center by ±b. These images may be complex-valued, and, by extracting one of them, the complex-valued representation of the object field may be obtained. A processor (e.g., processor 140 of FIG. 1) may be configured to extract one or more complex-valued images.

In order to extract the complex-valued image term, the spatial offset, angular offset, or the spatial and angular offset of the beams from the local oscillator may be increased such that the image terms (e.g., image terms 402 or 404 illustrated in FIG. 10) do not overlap with the autocorrelation term (e.g., autocorrelation term 400 illustrated in FIG. 10). However, in the case where object return radiation is substantially less than the magnitude of the radiation beam from a coherent radiation source (i.e., a weak return radiation case), the autocorrelation term (e.g., autocorrelation term 400 of FIG. 10) may be substantially negligible when compared to the strength of the image term, (e.g., image term 402 or 404 of FIG. 10) and thus at least some overlap may be tolerated. This consideration may influence the configuration of imaging systems (e.g., system 100 shown in FIG. 1, system 200 illustrated in FIG. 2, or system 300 depicted in FIG. 3, etc.), especially in the context of low object radiation return, as described below.

Digital holographic imaging process may be comprised of directing at least a portion of a first coherent radiation beam and at least a portion of a second coherent radiation beam towards a detector, where at least a portion of the second radiation beam is spatially offset, angularly offset, or spatially and angularly offset from at least a portion of the first coherent radiation beam. At least a portion of the first coherent radiation beam and at least a portion of the second coherent radiation beam may be combined to form a composite beam. A distant object may be radiated with the composite beam. A first intensity pattern may be formed by interfering with at least a portion of the return radiation from the radiated object with at least a portion of the first coherent radiation beam. A second intensity pattern may be formed with at least a portion of the return radiation from the radiated object and at least a portion of the second coherent radiation beam.

According to one aspect of the present invention, a superposition of the first intensity pattern and the second intensity pattern may be simultaneously recorded. A digital signal may be formed using the recorded superposition, and a processor may be configured to perform a Fourier transform of the digital signal. A first complex-valued component object image and a second complex-valued component object image may be extracted from the Fourier transform. The processor may be configured to determine the spatial separation, angular separation, or spatial and angular separation between at least a portion of the first coherent radiation beam and at least a portion of the return radiation from the radiated object, and locate the first complex-valued component object image from the determined separation. Similarly, the processor may determine the spatial separation, angular separation, or spatial and angular separation between at least a portion of the second coherent radiation beam and at least a portion of the return radiation from the radiated object, and locate the second complex-valued component object image from the determined angular separation.

Signal-to-Noise Ratio

In digital holographic imaging, the image terms in Eq. (2) may be proportional to the strength of the one or more beams from the local oscillator (e.g., one or more radiation beams 318 from one or more coherent radiation sources 320 illustrated in FIG. 3) multiplied by the strength of the object field (e.g., return radiation 308). Thus, if the object return radiation is substantially weak compared to the magnitude of the one or more beams from the local oscillator, the signal-to-noise ratio between the one or more beams from the local oscillator (e.g., one or more radiation beams 318 from one or more coherent radiation sources 320) and the return radiation (e.g., return radiation 308) may be increased by increasing the magnitude of the local oscillator. The derived equations for signal-to-noise ratios ("SNR") and related discussion below relate to the weak object field return radiation case. The SNR may be between the return radiation (e.g., return radiation 308) from a radiated object (e.g., object 302) and the one or more beams from a local oscillator (e.g., one or more radiation beams 318).

Consider an exemplary case that includes the effects of photon noise. A convenient quantity for characterizing the object return radiation strength may be the number of photons per speckle in the entrance pupil (e.g., entrance pupil 310 shown in FIG. 3) of the optical system. Consider an object for which the return level at the entrance pupil is 100 photons per speckle. This may be established by the source power (e.g., composite beam 304 and one or more coherent radiation sources 306) and the field-of-view. A local oscillator level (e.g., intensity of radiation beams 318), may be, for example, $10^5$ photons per speckle. Note that the selection of local oscillator radiation level may be typically chosen relative to the electron well capacity of a pixel of a detector (e.g., detector 326 shown in FIG. 3, etc.). Exceeding the well capacity may result in detector saturation.

Figure 11:
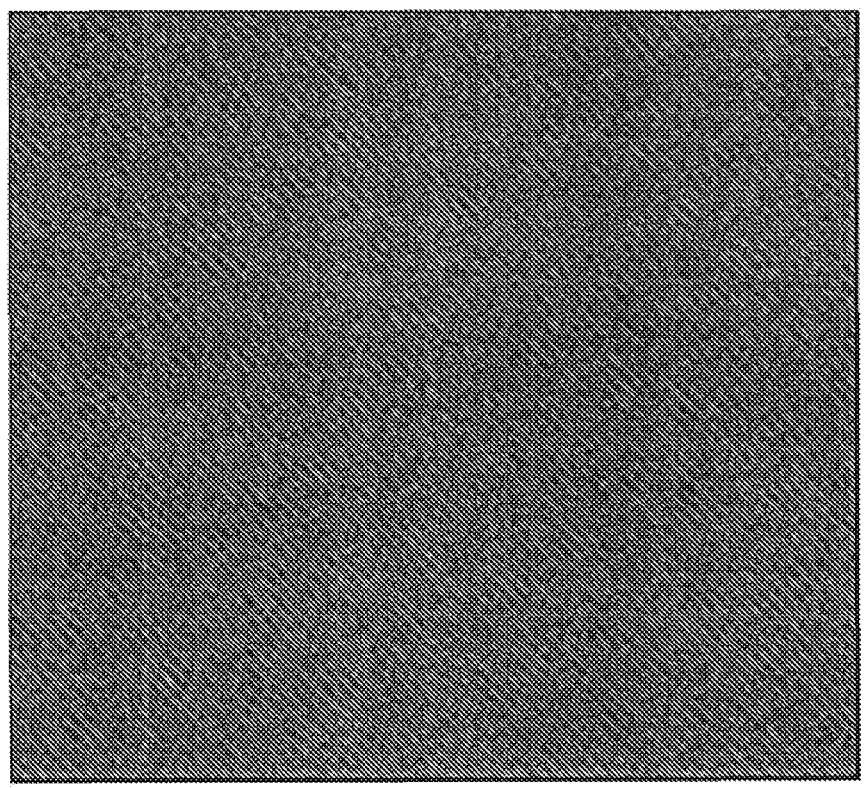
FIG. 11 illustrates an exemplary speckle intensity pattern corresponding to a low object signal level (100 photons per speckle) and high local oscillator level ($10^5$ photons per speckle) in accordance with one aspect of the present invention.

An example of the recorded intensity pattern for the low-return case described above is illustrated in FIG. 11. Note the reduced contrast and granular appearance of the pattern relative to the high-return case shown in FIG. 9. While the data in FIG. 11 appears noisy, the corresponding Fourier transform of the image in FIG. 11 reveals a quality image, as illustrated in FIG. 12.

Figure 12:
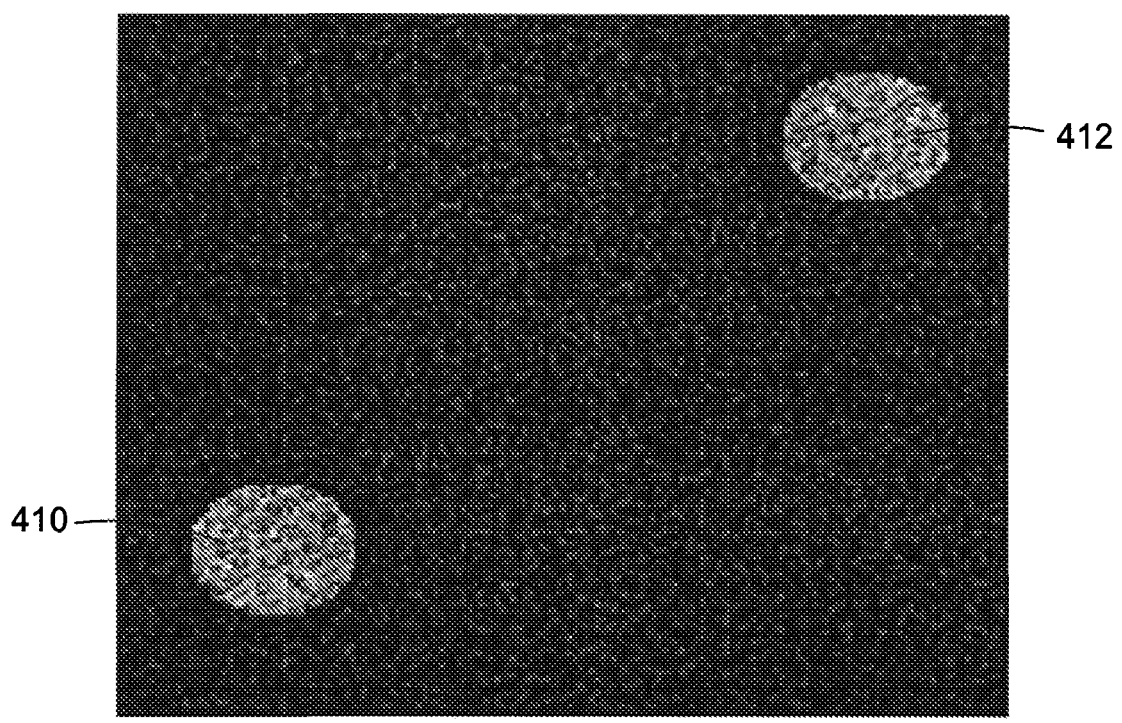
FIG. 12 illustrates a Fourier transform of the speckle intensity pattern of FIG. 11 in accordance with one aspect of the present invention.

An important feature of the image shown in FIG. 12 is that the central term corresponding to the object's autocorrelation term is not visible (in contrast to autocorrelation term 400 of FIG. 10, which is visible). Image terms (e.g., image terms 410 and 412 shown in FIG. 12) may be amplified by the local oscillator signal level, as mentioned above, whereas the autocorrelation term (not visible in FIG. 12) may not have such amplification. Thus, a central term corresponding to the object's autocorrelation may be substantially absent. The absence of the autocorrelation term may be desirable because lower spatial carrier frequencies may be utilized while still achieving separation of the image terms appearing in the autocorrelation. There may be, however, a higher noise bias. This noise bias may be related to the photon noise (i.e., shot noise) in the local oscillator (e.g., one or more coherent radiation sources 320). The SNR of spatial heterodyne imaging may be considered a quantification of the image strength relative to this photon noise bias.

The SNR of a deterministic point object or other object (e.g., object 302 shown in FIG. 3, etc.) may be calculated. The optical field in the field-stop plane (e.g., a plane located at field-stop 314 of FIG. 3) or other suitable position (e.g., any suitable imaging plane on or before detector 140 in FIG. 1 or detector 268 in FIG. 2) may be represented as two delta functions, one from the object at location a and one from the local oscillator (e.g., one or more coherent radiation sources 320) at location b. The strengths of the delta function fields are the square roots of their intensities given by $I_S$ and $I_{LO}$ for the object and local oscillator, respectively. The calculation may also take into account a relative phase, $\phi$, on the object. The optical field in the field-stop plane may be represented as $$U(x) = \sqrt{I_S}\exp(i\phi)\delta(x-a) + \sqrt{I_{LO}}\delta(x-b). \tag{5}$$

Propagation of the optical field to the detector plane corresponds to a Fourier transform in the arrangement shown in, for example, FIGS. 1-3. In other words, the propagation of the optical field to the detector plane may act as a Fourier transform. The field at the detector is then $$U(\xi) = \kappa\left(\sqrt{I_S}\exp\left(i\left(\phi - \frac{2\pi}{\lambda f}\xi a\right)\right) + \sqrt{I_{LO}}\exp\left(-i\frac{2\pi}{\lambda f}\xi b\right)\right), \quad (6)$$

where $\kappa$ is a substantially inessential constant. The signal recorded by the detector array may be represented as $$d(\xi) = \frac{\eta\tau}{h\nu}(P_S + P_{LO} + P_B) + \frac{\eta\tau}{h\nu}\sqrt{P_{LO}}\sqrt{P_S} \quad (7)$$
$$\left(\exp\left[i\left(\phi - \frac{2\pi}{\lambda f}\xi(a-b)\right)\right] + \exp\left[-i\left(\phi - \frac{2\pi}{\lambda f}\xi(a-b)\right)\right]\right),$$

where $P_S$ and $P_{LO}$ are the powers per detector pixel with an additional bias term, $P_B$, added to represent the uniform background contribution from dark current. The factor $\eta\tau/h\nu$ may convert from incident optical power to output signal in units of photoelectrons where $\eta$ is the detector quantum efficiency, $\tau$ is the integration time and $h\nu$ is the photon energy.

Using the detector output, the inverse Fourier transform or any other suitable Fourier transform of the recorded intensity may be determined (e.g., using processor 140 of FIG. 1, processor 270 of FIG. 2, processor 328 of FIG. 3, etc.):

$$D(s) = \frac{\eta\tau}{h\nu}(P_S + P_{LO} + P_B)\delta(s) + \frac{\eta\tau}{h\nu}\sqrt{P_{LO}}\sqrt{P_S} \quad (8)$$
$$\left(\exp(i\phi)\delta\left[s - \frac{2\pi}{\lambda f}(a-b)\right] + \exp(-i\phi)\delta\left[s + \frac{2\pi}{\lambda f}(a-b)\right]\right).$$

If this expression is evaluated at $$s = \frac{2\pi}{\lambda f}(a-b),$$

it may be determined that $$D\left(\frac{2\pi}{\lambda f}(a-b)\right) = \frac{\eta\tau}{h\nu}\sqrt{P_{LO}}\sqrt{P_S}\exp(i\phi). \quad (9)$$

The equation above indicates that the complex-valued signal may be determined by evaluating the Fourier transform of the detected intensity pattern at the corresponding location and that the signal strength is increased by increasing the magnitude of the local oscillator.

To evaluate the noise level, consider the constant terms in Eq. (7). It follows that the dominant noise source may be the photon noise that originates from these constants. This may give rise to the noise 'floor' of a formed three-dimensional image. To determine the magnitude of this noise, the signal may be regarded as being composed of a series of photoevents that occur at discrete locations in the detection plane. For simplicity, the bias terms may be combined into a single quantity $P = P_{LO} + P_s + P_B$. The contribution from this term may be indicated as a summation of K photoevents occurring at locations $\xi_n$ or $$d(\xi) = \sum_{n=1}^{K}\delta(\xi - \xi_n). \quad (10)$$

K is related to P by $$K = \frac{NP\eta\tau}{h\nu}, \quad (11)$$

where N is the total number of detectors.

The Fourier transform of d in the digital holographic detection process may be represented as $$D(s) = \frac{1}{\sqrt{N}}\int\sum_{n=1}^{K}\delta(\xi - \xi_n)\exp(-i2\pi\xi s)d\xi \quad (12)$$
$$= \frac{1}{\sqrt{N}}\sum_{n=1}^{k}\exp(-i2\pi\xi_n s)$$

which illustrates that D(s) may be a sum of a series of random phasors, thus indicating that the noise may be zero-mean Gaussian in nature. The $\sqrt{N}$ normalizing constant follows from Parseval's theorem. To evaluate the noise level in the transform, we take the expected value of $|D|^2$ or $$\langle|D(s)|^2\rangle = \frac{1}{N}\left\langle\sum_{m=1}^{K}\sum_{n=1}^{K}\exp(-i2\pi s(\xi_n - \xi_m))\right\rangle. \quad (13)$$

Note that there are two types of terms in Eq. (13): K diagonal terms for which n=m and the phasor $\exp(-i2\pi s(\xi_n - \xi_m))$ reduces to unity. For the remaining $K^2 - K$ non-diagonal terms, the expected value of the phase term in Eq. (13) may be then computed. Using the probability density function of the spatial distribution of the photoevents, $p(\xi_m, \xi_n)$ provides:

$$\langle\exp(-i2\pi s(\xi_m - \xi_n))\rangle = \iint p(\xi_m, \xi_n)\exp(-i2\pi s(\xi_m - \xi_n))$$
$$d\xi_m d\xi_n. \quad (14)$$

For the non-diagonal case of n≠m, $p(\xi_m, \xi_n) = p(\xi_m)p(\xi_n)$ giving $$\langle\exp(-i2\pi s(\xi_m - \xi_n))\rangle = \int p(\xi_m)\exp(-i2\pi s(\xi_m))d\xi_m \int p(\xi_n)$$
$$\exp(i2\pi s(\xi_n))d\xi_n. \quad (15)$$

Inspection of the right hand side of Eq. (15) indicates that it is equivalent to the squared magnitude of the characteristic function, where the characteristic function may be defined as the Fourier transform of the probability density function. Also, because the spatial distribution of the photoevents is typically uniform over the detector array, the characteristic function reduces to a delta function at s=0. This may give $$\langle|D(s)|^2\rangle = \frac{1}{N}(K + (K^2 - K)\delta(s)). \quad (16)$$

For this analysis, the location s=0 may be ignored because measurements at this location may not be useful. It then follows that the noise background is given by $$\langle |D(s \neq 0)|^2 \rangle = K/N, \tag{17}$$

which indicates that this background noise intensity is uniform over the image and is proportional to the total number of photons received divided by the number of detectors.

Combining the results of Eqs. (9) and (17) may provide the SNR for measurement of the intensity of a point using digital holographic detection. This SNR is determined by taking the ratio of the signal given by the squared magnitude of Eq. (9) and the noise given by Eq. (17) which yields $$SNR = \frac{\eta P_{LO} P_s \tau}{h\nu (P_{LO} + P_S + P_B)}, \tag{18}$$

For the case of the background being dominated by the local oscillator (e.g., one or more radiation beams 318 from one or more coherent radiation sources 320 shown in FIG. 3), Eq. (18) becomes $$SNR = \eta P_s \tau / h\nu, \tag{19}$$

which corresponds to quantum-limited detection and agrees with results for conventional heterodyne detection.

Fielded systems, such as those illustrated in FIGS. 1-3, are typically configured so that the detector samples the received radiation at the Nyquist sampling limit. To achieve this in the detection systems shown in FIGS. 1-3, the detector pixel size may be matched to the spatial frequency incident on the detector. This may be a function of the spatial offset, angular offset, or spatial or angular offset between the return radiation (e.g., return radiation 308 shown in FIG. 3, etc.) and local oscillator beams (e.g., one or more radiation beams 318 from one or more coherent radiation sources 320). For the low-signal case, the spatial offset, angular offset, or spatial and angular offset may be adjusted so that the local oscillator is at the edge of the object boundary. In this case, P, in Eq. (19) may be regarded as corresponding to the number of photons per speckle with the speckle size (and therefore detector width) given by $$S_{SPECKLE} = \lambda R / 2W, \tag{20}$$

where λ is the source wavelength, R is the range to the object and W is the object width. Eq. (20) may be useful for performing radiometric calculations to determine parameters such as sensor field-of-view and the desirable optical power of the coherent radiation.

Signal-to-Noise Ratio Example

In an exemplary signal-to-noise ratio (SNR) case, an object having width W that is located at a distance of R may be imaged. The object reflectivity may be represented as p, and the object may reflect diffusely into about 2π steradians. For a coherent radiation source power P, it follows that the signal level Ps is given by $$P_S = \frac{P\lambda^2 \rho}{16\pi W^2}. \tag{21}$$

Note that Eq. (21) is independent of object distance. Substitution of Eq. (21) into Eq. (19) gives $$SNR = \frac{\eta \tau P \lambda^3 \rho}{16 hc \pi W^2}. \tag{22}$$

In an exemplary case, a distant object may be radiated with a 50 mJ laser pulse; thus τP=50 milliJoules (mJ). Also, in this example, η=0.8, λ=1.5 μm, and ρ=0.1, and the object size may be W=5 meters (m) and the distance R=1 kilometer (km). From Eq. (20), it may be determined that the speckle size $S_{SPECKLE}$ is 150 μm. If, for example, the detector pixels are 25 μm in size, Nyquist sampling indicates that the magnification of the optical system in FIG. 3 (ratio of the focal lengths of the two lenses—one or more lenses 312 and Fourier lens 324) may be greater than or equal to six. From Eq. (22) it follows that for this scenario SNR=54.0.

Experimental Results for Multi-Function Coherent Imaging

In accordance with one aspect of the present invention, experimental demonstration of multi-function coherent data collection has been conducted using a system configuration similar to system 200 illustrated in FIG. 2. Two tunable laser diodes (e.g., StableWave TLB-7013 from Bookham, Inc., a division of New Focus) were used as coherent radiation sources at wavelengths $\lambda_1$ and $\lambda_2$. The operational wavelength for both laser diodes was about 780 nm. However, the wavelengths were slightly offset in order to perform three-dimensional imaging as described by Eq. (1).

Radiation from the laser diodes was divided so as to form the reference radiation beams (e.g., beams 220 and 240 shown in FIG. 2) and object radiation beams (e.g., composite beam 256 illustrated in FIG. 2). Free-space optics comprised of standard components were used for combining and expanding the object radiation beams. Thus, a laser beam comprised of co-propagating beams that originate from the two laser diodes was formed.

The reference radiation beams (e.g., beams 220 and 240) were formed by coupling a portion of the laser radiation into single-mode optical fibers (e.g., fibers 230 and 250 illustrated in FIG. 2). These fibers then fed fiber collimators (e.g., collimators 228 and 248). The collimators were configured such that the radiation beams emitted from the collimators arrived at the detector (e.g., detector 268) at different angles, thus producing different carrier frequencies in the recorded holographic data (e.g., intensity patterns recorded by detector 268) and supporting the multi-function coherent data collection. Note that the angles of the beams (e.g., beams 220 and 240) may be oriented so as to avoid image overlap, as discussed above.

Data was recorded using a detector such as digital camera model number LU120 from Lumenera Corporation. This camera communicatively interfaced with a computing device (e.g., laptop computer, personal computer, etc., shown in FIG. 2 as processor 270) using a USB (Universal Serial Bus) data port. Frames of digital data from the camera were transmitted to and processed by the computing device using MATLAB software from Mathworks, Inc.

Figure 13:
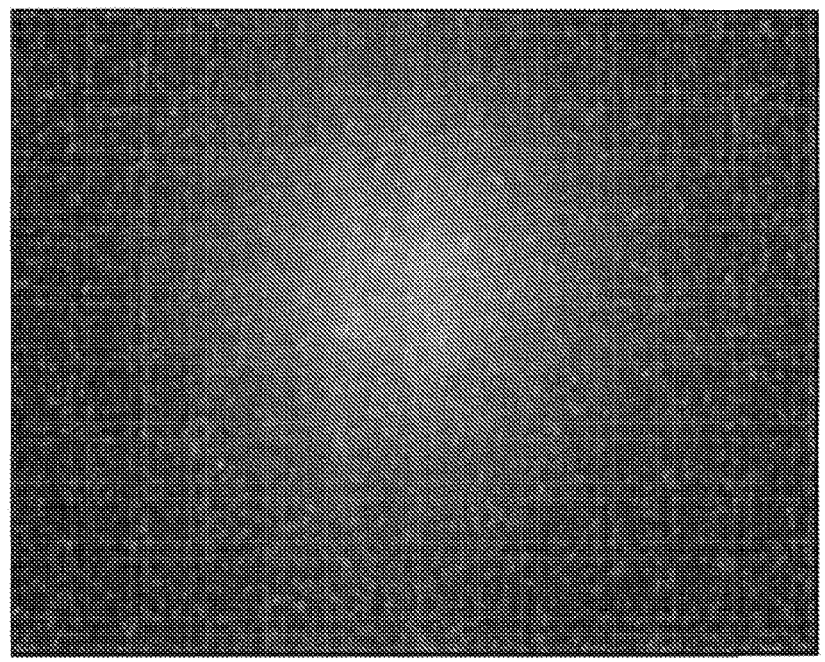
FIG. 13 illustrates an exemplary image of a superposition of intensity patterns recorded by a multi-function coherent imaging system in accordance with one aspect of the present invention.

An example of the data recorded by the camera is shown in FIG. 13, where the superposition of the interference patterns of the data recorded at the two wavelengths is depicted.

Figure 14:
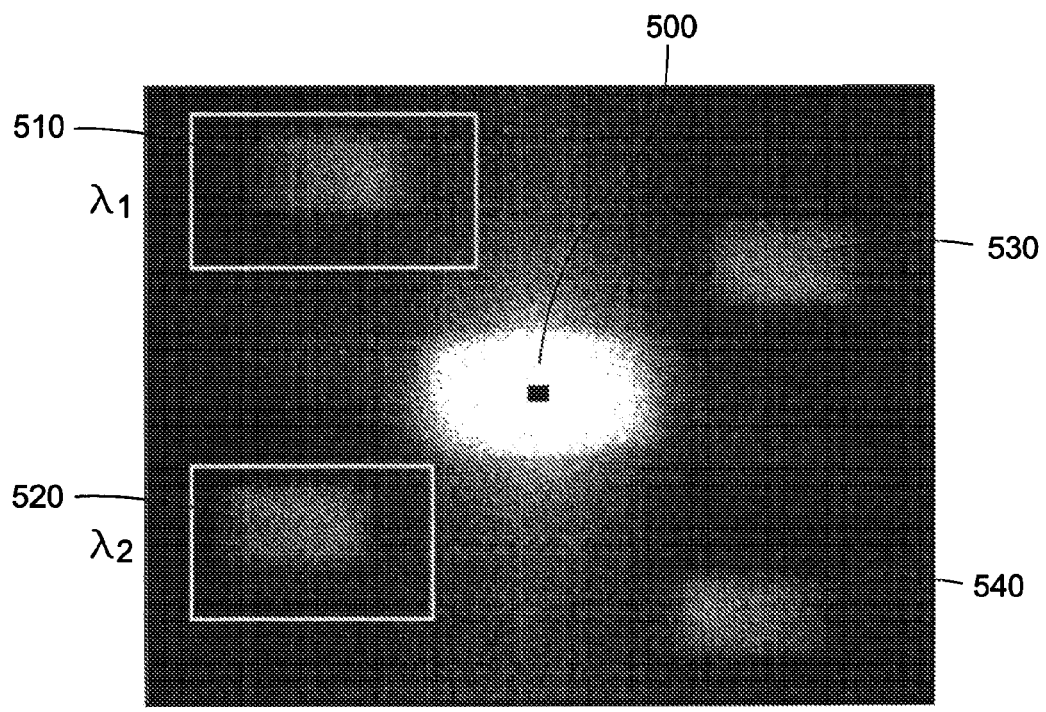
FIG. 14 illustrates a Fourier transform of the image illustrated in FIG. 13 in accordance with one aspect of the present invention.

Although MATLAB was used to compute the two dimensional Fourier transform of the data recorded by the camera, any suitable digital processor may be configured to compute the Fourier transform of the recorded data. The magnitude of this digital Fourier transform is shown in FIG. 14. Note that although distinct image regions are visible, they are blurred. This blur may arise, at least in part, because of an inherent defocus aberration may follow from the different optical conjugate distances of the object and reference radiation beams. In other words, the reference radiation beams are collimated and are thus at an infinite conjugate, whereas the object is at a finite distance.

To focus the images, the complex-valued sections of the images (e.g., sections 510 and 520 shown in FIG. 14, where section 500 represents an autocorrelation term, section 530 represents the complex conjugate of section 520, and section 540 represents the complex conjugate of section 510 may be extracted from the data sets, and image focusing methods based on maximizing image sharpness may be applied. Focusing based on sharpness allows automatic focus of the image by determining the focus required to produce the sharpest image as measured by a sharpness metric. Maximizing image sharpness can also be used to correct other aberrations in addition to correcting defocus. For example, the exemplary focusing methods applied to the captured images may be used for digital correction of aberrations described by multiple order Zernike polynomials.

Figure 15:
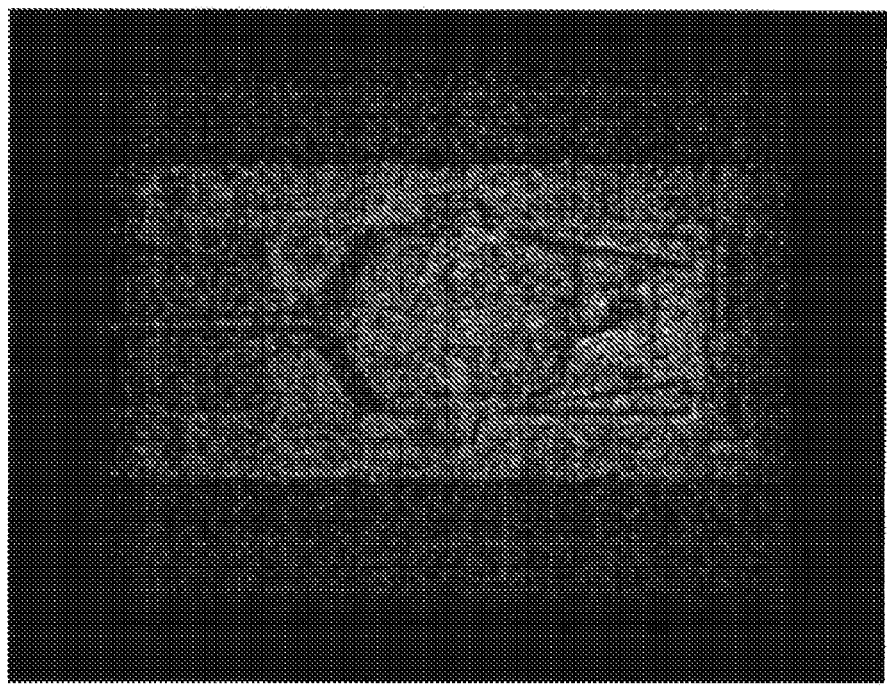
FIG. 15 illustrates a single focused image extracted from a region of FIG. 14 in accordance with one aspect of the present invention.
Figure 16:
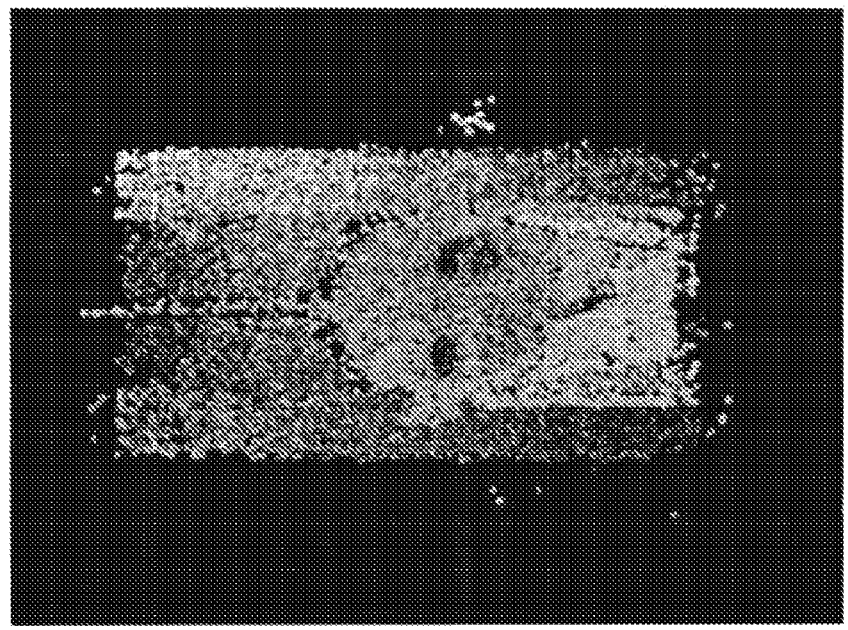
FIG. 16 illustrates a gray-scale encoded three-dimensional image of FIG. 15 resulting from phase difference processing of coherent multi-function data in accordance with one aspect of the present invention.

An exemplary focused image corresponding to a single wavelength (e.g., section 510 of FIG. 14, having a first wavelength) with visible image detail is shown in FIG. 15. The corresponding complex-valued image for the other wavelength (e.g., section 520 of FIG. 14, having a second wavelength) may be produced in a parallel manner. With the two complex-valued images, a three-dimensional image may be determined by computing the phase difference of the images as described in Eq. (1) above. The result of this process is shown in FIG. 16, which illustrates a gray scale encoded three-dimensional image of an object in a scene. Although the image depicted in FIG. 16 exhibits some granular noise from speckle, multiple realizations of the speckle pattern may be averaged (e.g., by processor 270 of FIG. 2) to reduce the noise in the image.

Multi-Function Detection

Figure 17:
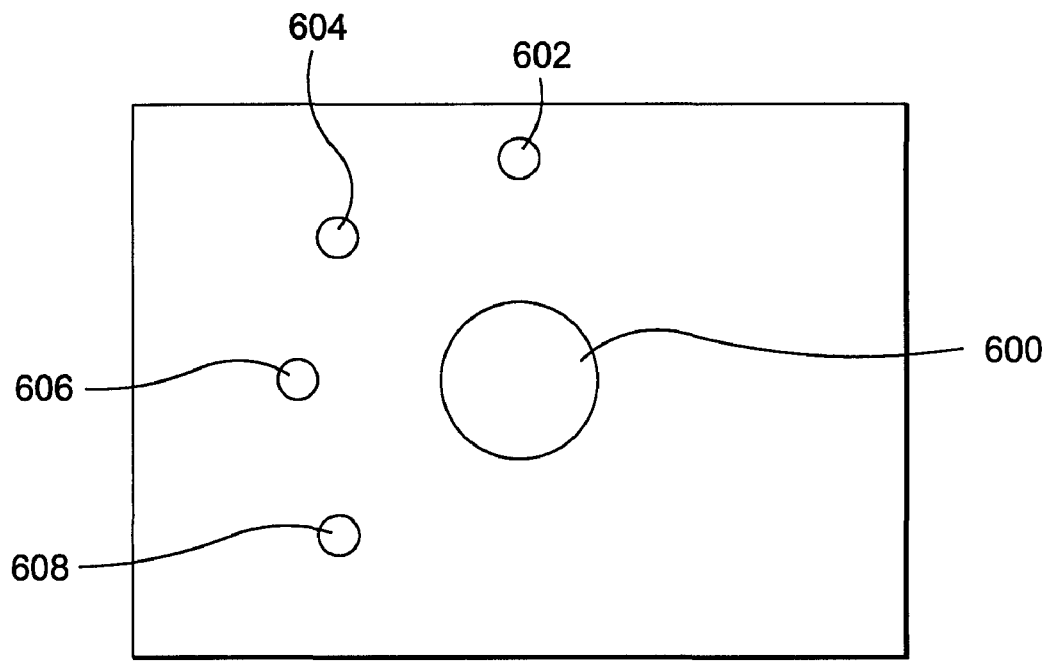
FIG. 17 illustrates an exemplary field-stop arrangement for multi-function coherent data collection in accordance with one aspect of the present invention.

The exemplary systems and methods discussed above indicates the ability to record two or more sets of coherent data. Such systems and methods may be extended for detecting several coherent images. This may, for example, be accomplished by using two or more radiation beams for recording an image of an object. FIG. 17 illustrates an exemplary field-stop arrangement that may be used to insert multiple radiation beams emerging from, for example, fiber-optic sources. As shown in the exemplary arrangement of FIG. 17, the radiation beams 602, 604, and 606, each of which may have a different wavelength, may be inserted in a geometric arrangement so as to avoid image overlap in Fourier data domain 600. In addition to radiation beams 602, 604, and 606, which may have differing wavelengths, other radiation beams, such as radiation beam 608, may have particular polarization state.

Figure 18:
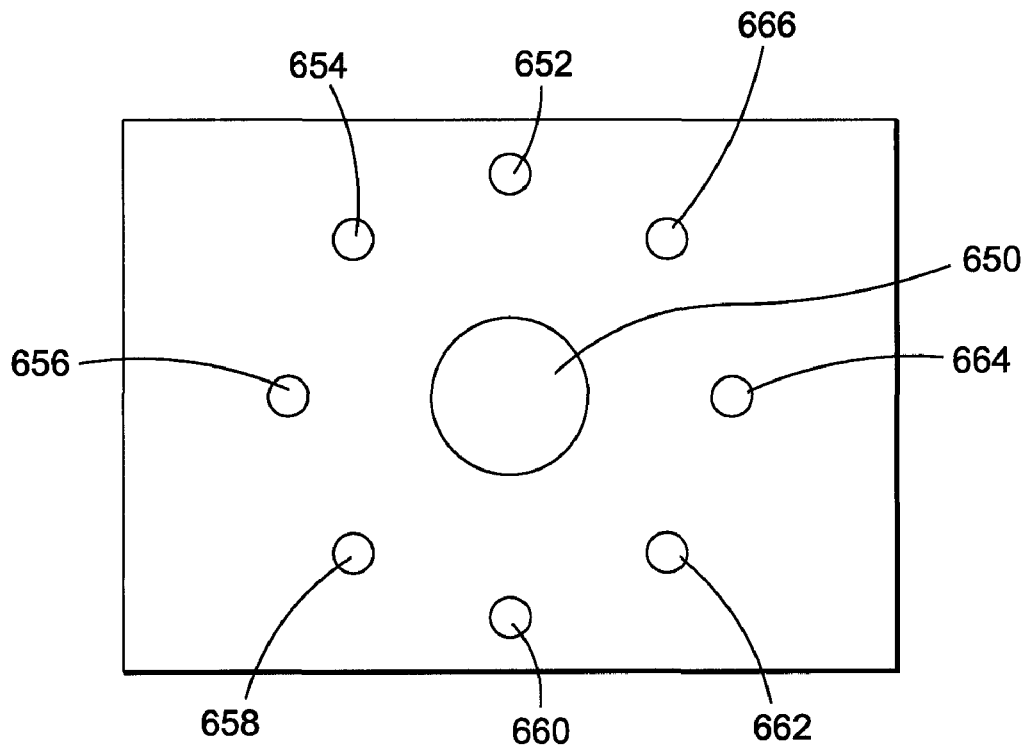
FIG. 18 illustrates a Fourier transform corresponding to the field-stop arrangement illustrated in FIG. 17 in accordance with one aspect of the present invention.

FIG. 18 illustrates data collection using the field-stop arrangement shown in FIG. 17 in accordance with one aspect of the present invention. The coherent images corresponding to the separate coherent functions appear at distinct locations in the digital Fourier transform relative to autocorrelation term 650. First intensity pattern Fourier transform having a first wavelength may be at location 652, a second intensity pattern Fourier transform having a second wavelength may be at location 654, and a third intensity pattern Fourier transform having a third wavelength may be at location 656, wherein these locations may correspond to intensity patterns 602, 604, and 606, respectively, in the field-stop arrangement of FIG. 17. In addition, a Fourier transform of a polarization channel may be at location 658, which may correspond to polarization channel 608 in the field-stop arrangement of FIG. 17.

Figure 19:
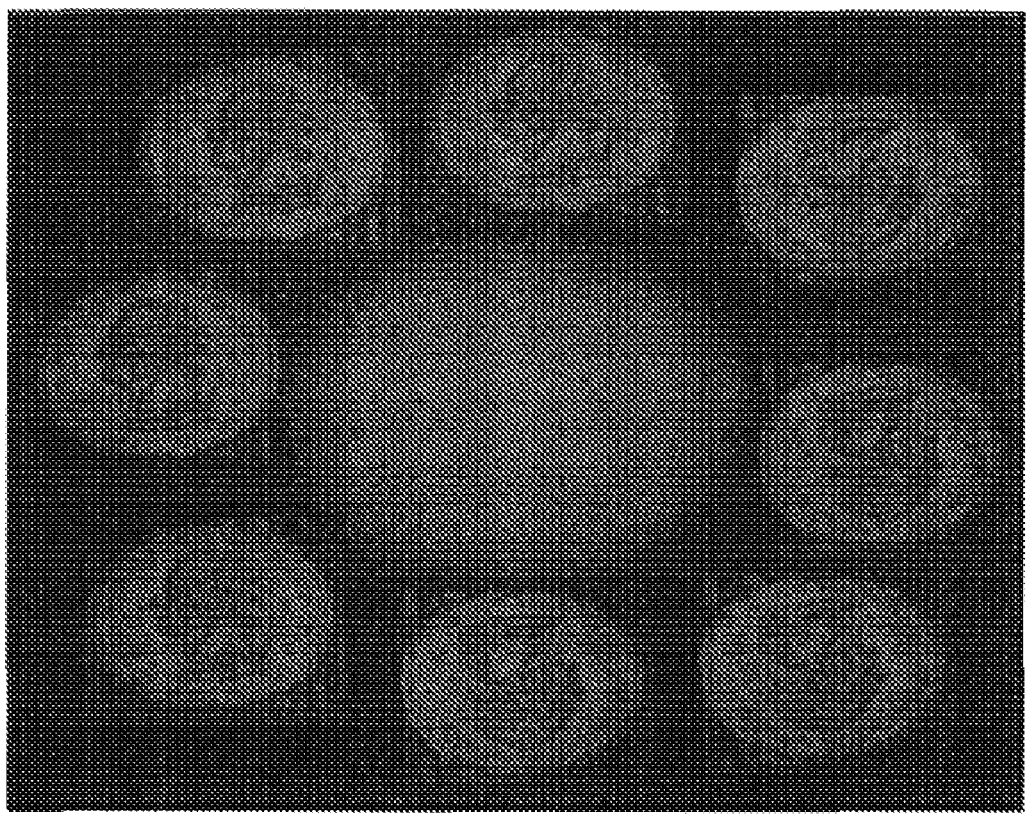
FIG. 19 illustrates a Fourier transform of an intensity pattern corresponding to the field-stop arrangement illustrated in FIG. 17 in accordance with one aspect of the present invention.

In the Fourier transform intensity field-stop arrangement illustrated in FIG. 18, a number of complex conjugate ("twin") images may be present. For example, complex conjugate 660 may be a twin of the first intensity pattern Fourier transform having a first wavelength at location 652, complex conjugate 662 may be a twin of second intensity pattern Fourier transform having a second wavelength at location 654, and complex conjugate 664 may be a twin of the third intensity pattern Fourier transform having a third wavelength at location 656. In addition, complex conjugate 666 may be a twin of the polarization channel at location 658. Thus, one or more coherent images may be extracted, and one or more coherent data processing functions may be performed on the extracted coherent images. For example, three-dimensional imaging using three or more wavelengths of radiation may be performed, thus reducing range ambiguities that may arise when imaging with two wavelengths. FIG. 19 is a further illustration of the digital Fourier transform of the intensity pattern corresponding to the field-stop arrangement shown in FIG. 17.

In addition, because the component images may have a finite size, there may be a maximum number of coherent functions that may be recorded simultaneously that is dependent on the detector size and the size of the image. The number of images may be increased or decreased, accordingly, by the selection of the detector size. As noted above, for the case of low-object return, the autocorrelation term may be negligible, and thus more space may be available for locating coherent images in the digital Fourier transform domain.

Multi-Aperture Detection

Figure 20:
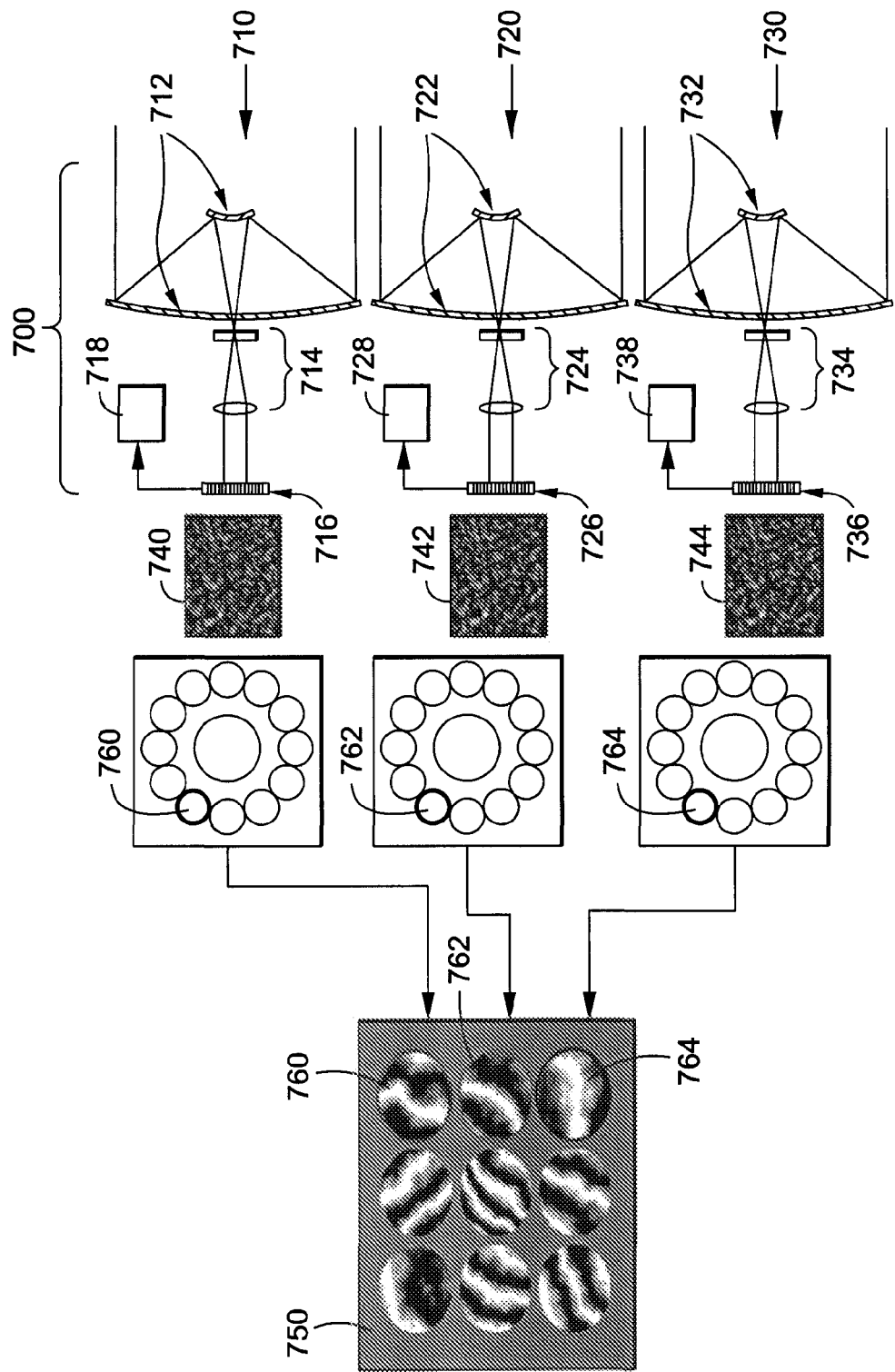
FIG. 20 illustrates a multi-aperture, multi-function coherent detection system in accordance with one embodiment of the present invention.

Coherent data from one or more spatially separated imaging systems may be combined to form a single image with spatial resolution corresponding to the size of the composite imaging aperture. Spatially separated imaging systems and methods for image formation are described, for example, in pending U.S. patent application Ser. No. 11/354,449 entitled, "Compensated Coherent Imaging for Improved Imaging and Directed Energy Weapons Applications," which is hereby incorporated by reference in its entirety. Multi-function coherent data may also be combined in a similar manner, as illustrated in FIG. 20. Multi-aperture telescope array 700 having imaging systems 710, 720 and 730, may employ digital holographic detection (e.g., in a similar manner to system 100 of FIG. 1, system 200 of FIG. 2, or system 300 of FIG. 3), with each imaging system 710, 720, and 730 configured to record multi-function coherent data. FIG. 20 illustrates that the multi-function data (e.g., as shown by intensity patterns 740, 742 and 744, recorded by imaging systems 710, 720, and 730, respectively) may be assembled into larger pupil replicas (e.g., digital replica pupil 750) from which three-dimensional (or other discriminant) images may be formed with resolution corresponding to the diffraction limit of the telescope array system 700.

As shown, imaging system 710 of multi-aperture telescope array 700 may have first telescope 712, and may also have imaging optics 714, detector 716, and processor 718. Detector 716 may record an intensity pattern of interference between a coherent radiation beam (sometimes referred to as a reference beam) having a first wavelength and return radiation from a radiated object. Processor 718 may determine the Fourier transform of the intensity pattern, wherein the radiation beam with the first wavelength may have location 760 in a field-stop in imaging optics 714. Similarly, imaging system 720 of multi-aperture telescope array 700 may have second telescope 722, having imaging optics 724, detector 726, and processor 728. Detector 726 may record an intensity pattern of interference between a coherent radiation beam (sometimes referred to as a reference beam) having a second wavelength and return radiation from a radiated object. Processor 728 may determine the Fourier transform of the intensity pattern, wherein the coherent radiation beam with the second wavelength may have location 762 in a field-stop in imaging optics 724. Imaging system 730 of multi-aperture telescope array 730 may have third telescope 732, imaging optics 734, detector 736, and processor 738. Detector 736 may record an intensity pattern of interference between a coherent radiation beam having a third wavelength and return radiation from a radiated object. Processor 738 may determine the Fourier transform of the intensity pattern, wherein the radiation beam with the third wavelength may have location 764 in a field-stop in imaging optics 734. Using the data from the recorded first, second and third intensity patterns (e.g., intensity patterns 740, 742, and 744), larger pupil replica 750 may be digitally formed using one or more processors.

Pulsed Radiation

According to one aspect of the present invention, the imaging systems described above in connection with FIGS. 1-3 generally concern continuous laser operation with detection properties established by the radiation integration time of a detector array. Detector arrays that operate in a framing mode typically have an integration time that is digitally controlled. This is commonly referred to as the frame integration time, and it may be analogous to the shutter duration or exposure time in a conventional photography system. Once the period of integration elapses, the detector array is read out, and a digital signal may be formed. In practice, commercially available detector arrays have integration times in the range from one or more milliseconds to one or more microseconds. Special purpose cameras with shorter integration times are also commercially available.

Coherent radiation sources, such as lasers, may be configured to limit the effective integration of the camera by using a radiation pulse (e.g., a pulsed laser beam) to radiate the object. For example, laser systems that are capable of outputting pulses that are below one nanosecond in duration may be utilized. Thus, images from fast moving objects may be recorded with effective integration times corresponding to the laser pulse duration.

According to one aspect of the present invention, coherent image detection systems may be configured to output pulses of radiation, where one or more radiation beams and return radiation from the object are incident on the detector at substantially the same time. This is desirable so as to form interference patterns between the radiation beam and the return radiation, which may be recorded by a detector. Furthermore, the beams may be mutually coherent so that they interfere.

Figure 21:
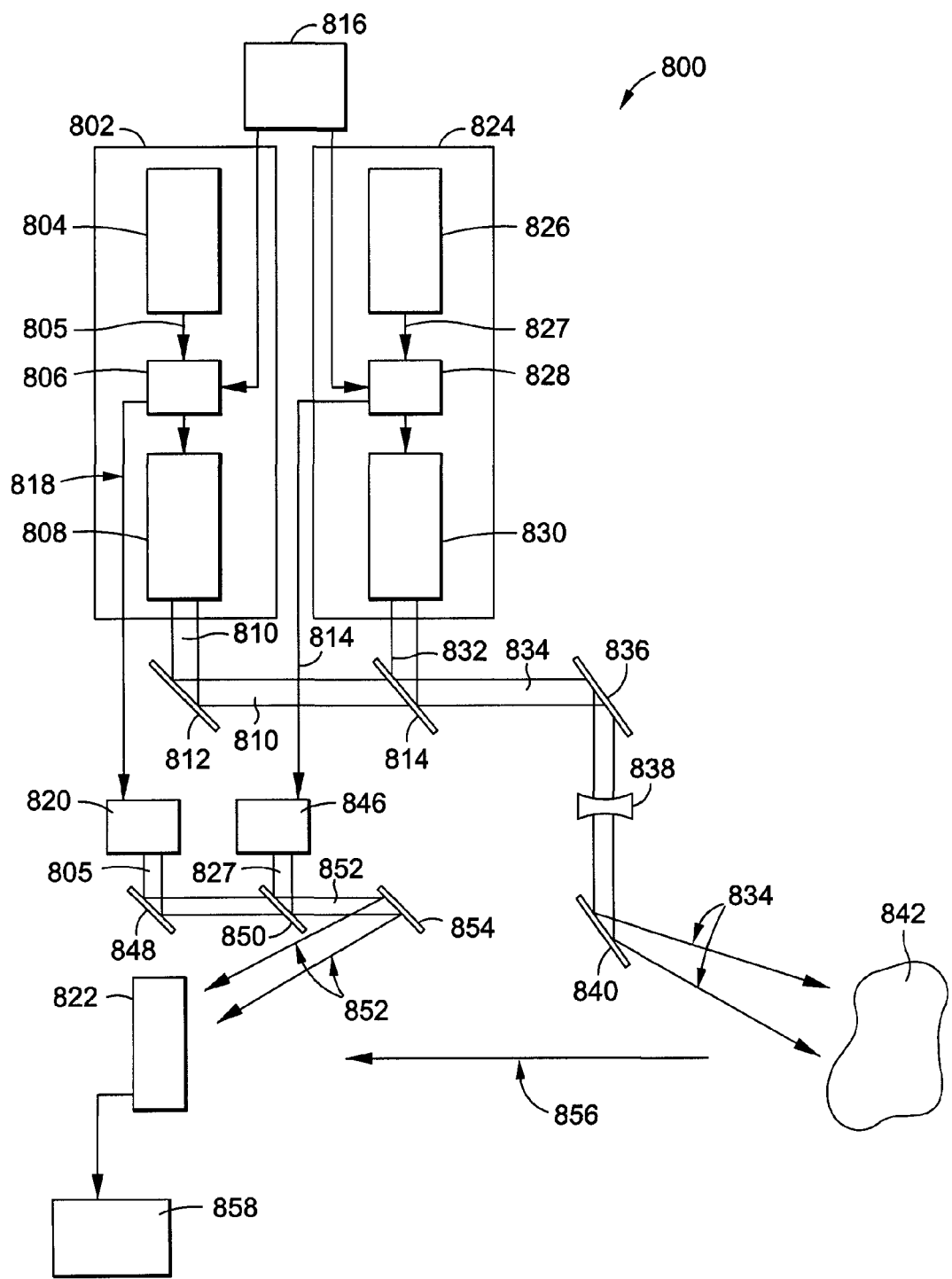
FIG. 21 illustrates a pulsed multi-function coherent detection system in accordance with one embodiment of the present invention.

An exemplary pulsed system 800 for coherent detection and imaging of distant objects is illustrated in FIG. 21 in accordance with one embodiment of the present invention. System 800 may be configured to have coherent radiation sources that have a Master Oscillator Power Amplifier (MOPA) configuration. Alternatively, system 800 may have a Master Oscillator Power Oscillator (MOPO) configuration. In the MOPA configuration, the power amplifier may act as a "slave" device to the master oscillator, and in the MOPO configuration, the power oscillator may act as the slave device to the master oscillator.

First coherent radiation source 802 may be comprised of master oscillator 804, optical switch 806, and slave device 808. Master oscillator 804, which may be a gas laser, solid-state laser, semiconductor laser, or fiber laser, or any other suitable coherent radiation source may output a first radiation beam, which may be directed to power amplifier 808 by optical switch 806. Slave device 808 may be a power amplifier, a power oscillator, or any other suitable device configured to receive the first radiation beam from master oscillator 804 and output a pulsed radiation beam (e.g., first pulsed radiation beam 810). First pulsed radiation beam 810 may be reflected by mirror 812 so as to direct the beam towards beamsplitter 814. Optical switch 806, which may be configured to be controlled by controller 816, may direct at least a portion of first radiation beam 805 through optical fiber 818 or other suitable arrangement and output the beam using fiber collimator 820. One vendor for optical switches in optical fiber configurations is EOSpace, Inc.

Optical switch 806 may include, for example, a fiber coupler to receive first radiation beam 805, and transmit it via optical fiber 818 to fiber collimator 820. Controller 816 may control optical switch 806 so as to "gate" at least a portion of first radiation beam 805 from master oscillator 804 so that beam 805 radiates detector 822 during a temporal period when return radiation from a radiated object is also radiating detector 822 (as shown, e.g., in FIG. 22). With the gating of first radiation beam 805, the amount of non-interfering radiation incident on detector 822 which may create unwanted background noise that adds to the noise of system 800 as described above may be minimized.

Second coherent radiation source 824 may be comprised of master oscillator 826, optical switch 828, and slave device 830. Master oscillator 826, which may be a gas laser, solid-state laser, semiconductor laser, or fiber laser, or any other suitable coherent radiation source may output second radiation beam 827, which may be directed to slave device 830 by optical switch 828. Slave device 830 may be a power amplifier, a power oscillator, or any other suitable device configured to receive second radiation beam from master oscillator 826 and output a pulsed radiation beam (e.g., second pulsed radiation beam 832). Second pulsed radiation beam 832 may be directed towards beam combiner 814. Beam combiner 814 may form pulsed composite beam 834, where first pulsed radiation beam 810 and second pulsed radiation beam 832 may co-propagate. Pulsed composite beam 834 may be reflected by mirror 836 so as to be directed through one or more optical elements 838, and reflected by mirror 840 to radiate object 842.

Optical switch 828, which may be configured to be controlled by controller 816, may direct at least a portion of the second radiation beam 827 through optical fiber 814 or other suitable arrangement and output the beam using fiber collimator 846. Optical switch 828 may include, for example, a fiber coupler to receive at least a portion of second radiation beam 827, and transmit it via optical fiber 814 to fiber collimator 846. Controller 816 may control optical switch 828 so as to "gate" at least a portion of beam 827 so that the beam radiates detector 822 during a temporal period when return radiation from a radiated object is also radiating detector 822 (see FIG. 22). With the gating of second radiation beam 827, the amount of non-interfering radiation incident on detector 822 which may create unwanted background noise that adds to the noise of the system 800 as described above may be minimized.

First radiation beam 805 from fiber collimator 820 may be reflected by mirror 848, towards beam combiner 850, where second radiation beam 827 from fiber collimator 846 may be reflected. First radiation beam 805 and second radiation beam 827 may co-propagate as composite beam 852 and be reflected by mirror 854 towards detector 822. Pulsed return radiation 856 from object 842 may also be directed towards detector 822.

A first intensity pattern may be formed from the interference between pulsed return radiation 856 from object 842 and from first radiation beam 805 (a component of composite beam 852). A second interference pattern may be formed from pulsed return radiation 856 from object 842 and second radiation beam 827 (a component of composite beam 852). Detector 822 may simultaneously record the superposition of the first intensity pattern and the second intensity pattern, and form an output signal. Processor 858 may receive the output signal and process the signal so as to form images in a similar manner as processors described above in connection with FIGS. 1-3.

System 800, illustrated in FIG. 21, may perform multi-function coherent image detection wherein the individual radiation beams (e.g., beams 805 and 827) are gated (e.g., using optical switches 806 or 828) in about the same temporal period or at different temporal periods. An advantage of this method is that it allows capturing of coherent images from highly dynamic objects using conventional two dimensional detector arrays with relatively slow frame rates and exposure times.

Temporal and signal considerations arise frequently in the field of LIDAR, wherein pulsed laser systems are used to make coherent measurements of backscatter from atmospheric particles to determine features such as wind velocity or scattering strength.

Figure 22:
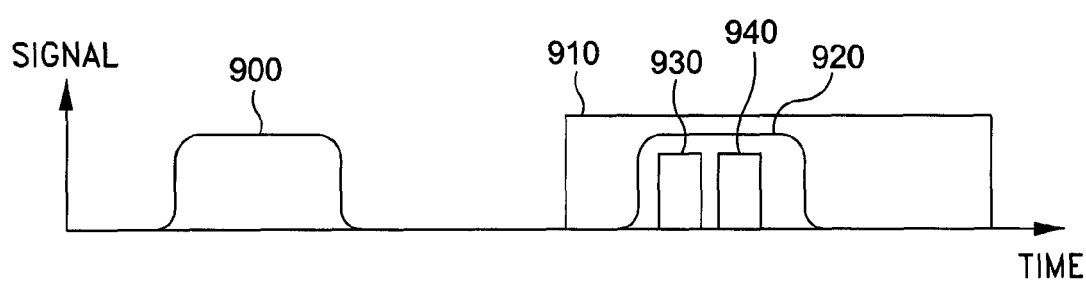
FIG. 22 illustrates a timing diagram for the pulsed multi-function coherent detection system of FIG. 21 in accordance with one aspect of the present invention.

FIG. 22 illustrates a timing diagram for the operation of system 800 of FIG. 21 in accordance with one aspect of the present invention. As shown in FIGS. 21-22, pulsed composite beam 834 may be output by system 800 at period 900. The integration temporal period of detector 822 may be represented by period 910. Period 910 may include various shorter temporal periods such as period 920, period 930, and period 940. During period 920, pulsed return radiation 856 from object 842 radiated by pulsed composite beam 834 may be, for example, incident on detector 822. First coherent radiation beam 805, which is gated by optical switch 806, may be incident on detector 822 during period 930. Second coherent radiation beam 827 may be, for example, incident on detector 822 during period 940. Alternatively, first coherent radiation beam 805 may be incident on detector 822 during period 940, and second coherent radiation beam 827 may be incident on detector 822 during period 930. Thus, controller 816 of system 800 may activate optical switches 806 and 828 in synchronization with pulsed return radiation 856 so that radiation beams 805 and 827 are incident on detector 822 during the integration period 910, and form intensity patterns of interference which may be recorded by detector 822. Coherent images may be formed for multiple discriminants with temporal properties controlled by controller 816, which is communicatively coupled to optical switches 806 and 828. Thus, multi-function coherent images may be recorded from a range of laser sensing parameters, including temporal parameters using conventional detector arrays.

One aspect of the present invention relates to a method for multi-function coherent imaging, comprising: directing at least a portion of a first coherent radiation beam and at least a portion of a second coherent radiation beam towards a first detector, wherein at least a portion of the second coherent radiation beam is spatially offset, angularly offset, or spatially and angularly offset from at least a portion of the first coherent radiation beam; combining at least a portion of the first coherent radiation beam and at least a portion of the second coherent radiation beam to form a first composite beam; radiating an object with at least a portion of the first composite beam; forming a first intensity pattern by interfering with at least a portion of the first return radiation from the radiated object with at least a portion of the first coherent radiation beam and a second intensity pattern with at least a portion of the first return radiation from the radiated object and at least a portion of the second coherent radiation beam; and simultaneously recording a first superposition of the first intensity pattern and the second intensity pattern.

The method may further comprise forming a digital signal using the recorded first superposition and performing a Fourier transform of the digital signal. The method may also comprise extracting a first complex-valued component object image and a second complex-valued component object image from the Fourier transform.

The method may further comprise determining the angular separation between at least a portion of the first coherent radiation beam and at least a portion of the first return radiation from the radiated object, and locating the first complex-valued component object image from the determined angular separation.

In addition, the method may comprise determining the angular separation between at least a portion of the second coherent radiation beam and at least a portion of the first return radiation from the radiated object, and locating the second complex-valued component object image from the determined angular separation. The method may further comprise determining a phase difference between the first complex-valued component object image and the second complex-valued component object image on a pixel-by-pixel basis, and forming at least one three-dimensional image from the determined phase difference.

Furthermore, the method may comprise removing one or more aberrations from at least a portion of the first complex-valued component object image, at least a portion of the second complex-valued component object image, or at least a portion of the first and second complex-valued component object images before forming the one three-dimensional image. The method may further comprise maximizing image sharpness of the first complex-valued component object image, the second complex-valued component object image, or the first and second complex-valued component object images before forming the one three-dimensional image.

The first radiation beam may comprise a first wavelength, a first polarization state, or a first wavelength and a first polarization state. The second radiation beam may comprise a second wavelength, a second polarization state, or a second wavelength and a second polarization state.

The method may further comprise forming a polarimetric image using at least a portion of the first polarization state, at least a portion of the second polarization state, or at least a portion of the first polarization state and the second polarization state.

Moreover, the method may comprise increasing a signal-to-noise ratio of the return radiation to the first coherent radiation beam by increasing the magnitude of the first coherent radiation beam. The method may further comprise increasing a signal-to-noise ratio of the return radiation to the second coherent radiation beam by increasing the magnitude of the second coherent radiation beam.

The method may also comprise: directing at least a portion of a third coherent radiation beam and at least a portion of a fourth coherent radiation beam towards a second detector, wherein at least a portion of the fourth coherent radiation beam is spatially offset, angularly offset, or spatially and angularly offset from at least a portion of the third coherent radiation beam; combining at least a portion of the third coherent radiation beam and at least a portion of the fourth coherent radiation beam to form a second composite beam; radiating at least a portion of the object with the second composite beam; forming a third intensity pattern by interfering with at least a portion of the second return radiation from the radiated object with at least a portion of the third coherent radiation beam and at least a portion of the fourth intensity pattern with at least a portion of the second return radiation from the radiated object and at least a portion of the fourth coherent radiation beam; and simultaneously recording a second superposition of the third intensity pattern and the fourth intensity pattern. The method may further comprise outputting a first signal having the recorded first superposition from the first detector and outputting a second signal having the recorded second superposition from the second detector. The method may also comprise determining the Fourier transform of the first signal and the second signal, and forming a multi-aperture image using the Fourier transform of the first signal and the Fourier transform of the second signal.

Another aspect of the present invention relates to a method for multi-function coherent imaging, comprising: outputting a first coherent radiation beam and a second coherent radiation beam; pulsing the first coherent radiation beam so as to output a first pulsed radiation beam coherent with the first radiation beam towards an object to be imaged; pulsing the second coherent radiation beam so as to output a second pulsed radiation beam coherent with the second radiation beam towards the object to be imaged; gating at least a portion of the first coherent radiation beam such that at least a portion of the first radiation beam radiates a detector during a temporal period when at least a portion of the return radiation is returning from the object; gating at least a portion of the second coherent radiation beam such that at least a portion of the second radiation beam radiates the detector during a temporal period when at least a portion of the return radiation is returning from the object; and simultaneously recording a superposition of a first intensity pattern of a first interference between at least a portion of the first coherent radiation beam and at least a portion of the return radiation from the object, and a second intensity pattern of a second interference between at least a portion of the second coherent radiation beam and at least a portion of the return radiation from the object.

The method may further comprise gating of the portion of the first coherent radiation beam and the gating of the portion of the second coherent radiation beam at substantially the same temporal period or different temporal periods. The method may also comprise synchronizing at least a portion of the first coherent radiation beam, at least a portion of the second coherent radiation beam, or at least a portion of the first and second coherent radiation beams incidence on the detector with the return radiation from the object.

According to one aspect, the systems and methods of the present invention provide creation of images with mega-pixels of information, whereas other systems and methods have limited imaging capabilities or substantially increased complexity.

An advantage of the present invention according to one aspect is that large-format, lower-speed detector arrays are utilized that provide excellent imaging quality at lower cost and lower complexity than custom, high-speed detector arrays. Large-format detector arrays provide advantages over small-format detector arrays having fewer pixels. Another advantage of the present invention according to one aspect is that multi-function data is recorded in a spatially parallel manner, rather than serially. Yet another advantage of the present invention according to one aspect is that a high-speed shuttering of an imaging detector is not necessary. Yet another advantage of the present invention according to one aspect is that it is not necessary to scan a radiation beam over a target object, as flood illumination, such as with a diverging laser beam is utilized.

The detailed description set forth above in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for."

What is claimed is:

1. A method for multi-function coherent imaging, comprising:
   outputting, with a first coherent radiation source, a first radiation beam;
   outputting, with a second coherent radiation source, a second radiation beam;
   directing, with one or more first optical components, at least a portion of the first radiation beam toward a first detector;
   directing separately at least a portion of the second radiation beam towards the first detector, wherein at least a portion of the second radiation beam is spatially offset, angularly offset, or spatially and angularly offset from at least a portion of the first radiation beam;
   combining, with one or more second optical components, at least a portion of the first radiation beam and at least a portion of the second radiation beam to form a first composite beam;
   directing, with the one or more second optical components, the first composite beam towards an object to be imaged;

combining, with the one or more first optical components and the one or more second optical components, at least a portion of the first radiation beam directed toward the first detector, at least a portion of the second radiation beam directed toward the first detector, and at least a portion of a first return radiation from the object in a first instance at the first detector; and simultaneously recording, with the first detector, a first superposition of a first intensity pattern and a second intensity pattern, wherein the first intensity pattern is an intensity pattern of a first interference between at least a portion of the first radiation beam and at least a portion of the first return radiation from the object, wherein the second intensity pattern is an intensity pattern of a second interference between at least a portion of the second radiation beam and at least a portion of the first return radiation from the object.

2. The method of claim 1, further comprising:
receiving, with an optical entrance pupil, at least a portion of the first return radiation from the object;
imaging, with a field-stop, at least a portion of the first return radiation from the optical entrance pupil; and
inserting, with at least one optical component, at least a portion of the first radiation beam and at least a portion of the second radiation beam in a plane conjugate to at least a portion of the first return radiation from the field-stop.

3. The method of claim 2, further comprising imaging, with one or more lenses, at least a portion of the first return radiation received by the entrance pupil onto the field-stop.

4. The method of claim 1, further comprising imaging, with at least one Fourier transform lens, at least a portion of the first intensity pattern and at least a portion of the second intensity pattern onto the first detector.

5. The method of claim 1, further comprising outputting, with the first detector, a signal with the recorded first superposition.

6. The method of claim 5, further comprising determining, with a processor communicatively coupled to the first detector, the Fourier transform of the signal.

7. The method of claim 6, further comprising extracting, with the processor, a first complex-valued component object image and a second complex-valued component object image from the Fourier transform.

8. The method of claim 7, further comprising:
determining, with the processor, the angular separation between at least a portion of the first radiation beam and at least a portion of the first return radiation from the radiated object; and
locating, with the processor, the first complex-valued component object image from the determined angular separation.

9. The method of claim 7, further comprising:
determining, with the processor, the angular separation between at least a portion of the second radiation beam and at least a portion of the first return radiation from the radiated object; and
locating, with the processor, the second complex-valued component object image from the determined angular separation.

10. The method of claim 7, further comprising:
determining, with the processor, a phase difference between at least a portion of the first complex-valued component object image and at least a portion of the second complex-valued component object image on a pixel-by-pixel basis; and
forming, with the processor, at least one three-dimensional image from the determined phase difference.

11. The method of claim 10, further comprising removing, with the processor, one or more aberrations from at least a portion of the first complex-valued component object image, at least a portion of the second complex-valued component object image, or at least a portion of the first and second complex-valued component object images before forming the at least one three-dimensional image.

12. The method of claim 10, further comprising maximizing, with the processor, image sharpness of at least a portion of the first complex-valued component object image, at least a portion of the second complex-valued component object image, or at least a portion of the first and second complex-valued component object images before forming the at least one three-dimensional image.

13. The method of claim 1, wherein the first radiation beam comprises a first wavelength, a first polarization state, or a first wavelength and a first polarization state and wherein the second radiation beam comprises a second wavelength, a second polarization state, or a second wavelength and a second polarization state.

14. The method of claim 13, further comprising forming, with a processor communicatively coupled to the first detector, at least one polarimetric image using the first polarization state, the second polarization state, or the first polarization state and the second polarization state recorded by the first detector.

15. The method of claim 1, further comprising increasing, with the first coherent radiation source, the magnitude of the first radiation beam to increase a signal-to-noise ratio of the first return radiation to the first radiation beam.

16. The method of claim 1, further comprising increasing, with the second coherent radiation source, the magnitude of the second radiation beam to increase a signal-to-noise ratio of the first return radiation to the second radiation beam.

* * * * *